United States Patent
Jovicic et al.

(10) Patent No.: US 9,735,868 B2
(45) Date of Patent: Aug. 15, 2017

(54) DERIVATION OF AN IDENTIFIER ENCODED IN A VISIBLE LIGHT COMMUNICATION SIGNAL

(71) Applicant: QUALCOMM Incorporated, San Diego, CA (US)

(72) Inventors: Aleksandar Jovicic, Jersey City, NJ (US); Mahadevi Pillai Perumal, Piscataway, NJ (US); Thomas Joseph Richardson, South Orange, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/339,170

(22) Filed: Jul. 23, 2014

(65) Prior Publication Data
US 2016/0028477 A1   Jan. 28, 2016

(51) Int. Cl.
*H04B 10/116* (2013.01)

(52) U.S. Cl.
CPC ................. *H04B 10/116* (2013.01)

(58) Field of Classification Search
CPC .. H04B 10/116; H04B 10/1149; H04B 10/60; H04B 10/691
USPC .................................................... 398/72, 172
See application file for complete search history.

(56) References Cited

U.S. PATENT DOCUMENTS

| | | | | |
|---|---|---|---|---|
| 5,544,049 A * | 8/1996 | Henderson | ........ | G06F 17/30011 704/7 |
| 8,188,878 B2 * | 5/2012 | Pederson | ........... | G07C 9/00158 340/815.45 |
| 8,248,467 B1 * | 8/2012 | Ganick | ................ | G01C 21/206 340/13.24 |
| 8,334,898 B1 * | 12/2012 | Ryan | .................... | G01C 21/206 348/61 |
| 8,334,901 B1 | 12/2012 | Ganick et al. | | |
| 8,380,081 B2 * | 2/2013 | Kim | ....................... | H04B 3/542 398/154 |
| 8,428,469 B2 * | 4/2013 | Kim | .................... | H04W 72/048 398/127 |
| 8,660,436 B2 * | 2/2014 | Schenk | .............. | H05B 37/0272 315/294 |
| 8,737,842 B2 * | 5/2014 | Schenk | .............. | H05B 33/0863 398/107 |

(Continued)

OTHER PUBLICATIONS

"identifer", Merriam Webster Dictionary, http://www.merriam-webster.com/dictionary/identifier, Jan. 25, 2016.*

(Continued)

*Primary Examiner* — David Payne
*Assistant Examiner* — Tanya Motsinger
(74) *Attorney, Agent, or Firm* — Holland & Hart LLP

(57) ABSTRACT

Methods, systems, and devices are described for deriving an identifier encoded in a visible light communication (VLC) signal. One method includes capturing a first part of the VLC signal; extracting, from the first part of the VLC signal, a first pattern of bits representing at least a portion of the identifier encoded in the VLC signal; comparing the first pattern of bits to different portions of a plurality of identifiers; and identifying, based at least in part on the comparing, a subset of the plurality of identifiers as candidate matches to the identifier encoded in the VLC signal.

30 Claims, 14 Drawing Sheets

(56) References Cited

U.S. PATENT DOCUMENTS

| | | | | |
|---|---|---|---|---|
| 8,861,976 | B2* | 10/2014 | Roberts | H04L 1/0625 398/172 |
| 9,014,564 | B2* | 4/2015 | Roberts | H04B 10/116 382/280 |
| 9,042,738 | B2* | 5/2015 | Schenk | H04B 10/1149 398/118 |
| 9,363,203 | B2* | 6/2016 | Denham | H04L 49/15 |
| 2002/0087647 | A1* | 7/2002 | Quine | G06Q 10/107 709/206 |
| 2006/0221984 | A1 | 10/2006 | Denham | |
| 2007/0008179 | A1* | 1/2007 | Hedley | G07B 15/06 340/928 |
| 2008/0281515 | A1* | 11/2008 | Ann | G01C 21/20 701/434 |
| 2008/0310850 | A1* | 12/2008 | Pederson | G07C 9/00158 398/135 |
| 2009/0026978 | A1* | 1/2009 | Robinson | H05B 37/0272 315/294 |
| 2009/0175594 | A1* | 7/2009 | Ann | H04N 7/025 386/357 |
| 2010/0268700 | A1* | 10/2010 | Wissner | G06F 17/30864 707/706 |
| 2011/0064420 | A1* | 3/2011 | Rajagopal | H04B 10/1125 398/154 |
| 2011/0069957 | A1* | 3/2011 | Kim | H04B 3/542 398/75 |
| 2011/0135317 | A1* | 6/2011 | Chaplin | H04B 10/1149 398/172 |
| 2013/0028612 | A1* | 1/2013 | Ryan | G01S 1/70 398/172 |
| 2013/0126713 | A1 | 5/2013 | Haas et al. | |
| 2013/0136456 | A1* | 5/2013 | Yoo | H04B 10/116 398/118 |
| 2013/0163994 | A1 | 6/2013 | Iizuka et al. | |
| 2013/0208184 | A1 | 8/2013 | Castor et al. | |
| 2013/0247117 | A1* | 9/2013 | Yamada | G08C 17/02 725/93 |
| 2014/0086590 | A1* | 3/2014 | Ganick | G06Q 30/02 398/118 |
| 2014/0093254 | A1* | 4/2014 | Gotou | H04B 10/116 398/203 |
| 2014/0186048 | A1* | 7/2014 | Oshima | H04B 10/541 398/118 |
| 2014/0186049 | A1* | 7/2014 | Oshima | H04B 10/1143 398/118 |
| 2014/0186050 | A1* | 7/2014 | Oshima | H04B 10/1143 398/118 |
| 2014/0186052 | A1* | 7/2014 | Oshima | H04B 10/1143 398/130 |
| 2014/0199082 | A1 | 7/2014 | Iizuka | |
| 2014/0207517 | A1* | 7/2014 | Oshima | H04N 5/2356 705/7.29 |
| 2014/0286644 | A1* | 9/2014 | Oshima | H04B 10/11 398/118 |
| 2014/0301737 | A1* | 10/2014 | Guo | H04B 10/116 398/118 |
| 2015/0134414 | A1* | 5/2015 | Shaffer | G06Q 30/0203 705/7.32 |
| 2015/0139659 | A1* | 5/2015 | Oshima | H04B 10/116 398/118 |
| 2015/0146871 | A1* | 5/2015 | Liu | H04L 9/0852 380/256 |
| 2015/0147067 | A1* | 5/2015 | Ryan | H04B 10/116 398/118 |
| 2015/0188632 | A1* | 7/2015 | Aoyama | H04B 10/116 398/118 |
| 2015/0188633 | A1* | 7/2015 | Liu | H04B 10/116 398/118 |
| 2015/0245448 | A1* | 8/2015 | Readler | H05B 37/0272 398/106 |
| 2015/0263806 | A1* | 9/2015 | Puscasu | F41H 1/00 398/130 |
| 2016/0191158 | A1* | 6/2016 | Aoyama | H04B 10/1149 398/172 |
| 2016/0191159 | A1* | 6/2016 | Aoyama | H04N 21/436 398/172 |

OTHER PUBLICATIONS

"identify" Merriam-Webster Dictionary, http://www.merriam-webster.com/dictionary/identifies, Jan. 25, 2016.*

ISA/EPO, International Search Report and Written Opinion of the International Searching Authority, Int'l Appl. No. PCT/US2015/037412, Sep. 28, 2015, European Patent Office, Rijswijk, NL, 9 pgs.

IPEA/EP, Second Written Opinion of the International Preliminary Examining Authority, Int'l Appl. No. PCT/US2015/037412, Jul. 4, 2016, European Patent Office, Munich, DE, 5 pgs.

* cited by examiner

DERIVATION OF AN IDENTIFIER ENCODED IN A VISIBLE LIGHT COMMUNICATION SIGNAL

BACKGROUND

The following relates generally to visible light communication, and more specifically to the derivation of an identifier (e.g., an identifier of a light fixtures) encoded in a visible light communication signal. Visible light communication (VLC) involves the transmission of information through modulation of the light intensity of a light source (e.g., the modulation of the light intensity of one or more light emitting diodes (LEDs)). Generally, visible light communication is achieved by transmitting, from a light source such as an LED or laser diode (LD), a modulated visible light signal, and receiving and processing the modulated visible light signal at a receiver (e.g., a mobile device) having a photo detector (PD) or array of PDs (e.g., a complementary metal-oxide-semiconductor (CMOS) image sensor (e.g., a camera)).

As the light emission efficiency of the LED is improved and the cost thereof decreases, the LED has become common in general lighting applications for residential, commercial, outdoor, and industrial market segments. The LED has also become common in special lighting applications as portable devices, display devices, vehicles, sign lamps, signboards, etc. By modulating an LED at a high speed at which the modulation cannot be perceived by a human being, it is possible to transmit data at high speeds. The distance and position of a receiver from the light source, however, may impact the receiver's ability to correctly demodulate and decode the data communicated from the light source using VLC signals. For example, if the receiver is a certain distance away from the light source, the receiver may be able to demodulate and decode a portion of the VLC signal. Further, erasures of a portion of the transmitted data may be inherent in the receiver as a result of a rolling shutter in the receiver. As a result, the receiver may not receive all of the information transmitted by the light source.

SUMMARY

In some aspects, the described features generally relate to one or more improved methods, systems, and/or devices for deriving an identifier encoded in a VLC signal. More particularly, the methods, systems, and/or devices enable the derivation of an identifier encoded in a VLC signal to begin (and possibly finish) prior to capture of the entirety of the identifier.

In a first set of illustrative examples, a method for deriving an identifier encoded in a VLC signal is described. In one configuration, the method may include capturing a first part of the VLC signal; extracting, from the first part of the VLC signal, a first pattern of bits representing at least a portion of the identifier encoded in the VLC signal; comparing the first pattern of bits to different portions of a plurality of identifiers; and identifying, based at least in part on the comparing, a subset of the plurality of identifiers as candidate matches to the identifier encoded in the VLC signal.

In some examples, the method may include capturing a second part of the VLC signal; extracting from the captured second part of the VLC signal, a second pattern of bits representing at least a portion of the identifier encoded in the VLC signal; comparing the second pattern of bits to different portions of the subset of the plurality of identifiers; and identifying, based at least in part on the comparing, a second subset of the plurality of identifiers as candidate matches to the identifier encoded in the VLC signal. In some examples of the method, the VLC signal may include multiple instances of the identifier; the first pattern of bits may include at least a portion of a first instance of the identifier; and the second pattern of bits may include at least a portion of a second instance of the identifier.

In some examples, the method may include capturing a second part of the VLC signal; extracting from the captured second part of the VLC signal, a second pattern of bits representing at least a portion of the identifier encoded in the VLC signal; and combining the second pattern of bits with the first pattern of bits to form a combined pattern of bits. In some examples, the method may further include comparing the combined pattern of bits to different portions of the subset of the plurality of identifiers; and identifying, based at least in part on the comparing, a second subset of the plurality of identifiers as candidate matches to the identifier encoded in the VLC signal. In some examples, the method may further include comparing the combined pattern of bits to different portions of the plurality of identifiers; and identifying, based at least in part on the comparing, a second subset of the plurality of identifiers as candidate matches to the identifier encoded in the VLC signal.

In some examples of the method, capturing the first part of the VLC signal may include capturing the first part of the VLC signal as illuminated portions of at least one image using a rolling shutter image sensor, and extracting the first pattern of bits may include extracting a pattern of pixel brightness values from the at least one image. In some examples of the method, capturing the first part of the VLC signal may include capturing a synchronization signal encoded in the VLC signal, and the method may further include restricting the comparing the first pattern of bits to different portions of the plurality of identifiers based at least in part on a relationship of the synchronization signal to the first pattern of bits.

In some examples, the method may include identifying the one of the plurality of identifiers as the identifier encoded in the VLC signal when the subset of the plurality of identifiers contains one of the plurality of identifiers. In some examples of the method, each of the plurality of identifiers may correspond to a different VLC-enabled light source. In some examples, the method may further include receiving the plurality of identifiers from a database associated with a venue.

In a second set of illustrative examples, a device for deriving an identifier encoded in a VLC signal is described. In one configuration, the device may include means for capturing a first part of the VLC signal; means for extracting, from the first part of the VLC signal, a first pattern of bits representing at least a portion of the identifier encoded in the VLC signal; means for comparing the first pattern of bits to different portions of a plurality of identifiers; and means for identifying, based at least in part on the comparing, a subset of the plurality of identifiers as candidate matches to the identifier encoded in the VLC signal. In some examples, the device may further include means for implementing one or more aspects of the method described above with respect to the first set of illustrative examples.

In a third set of illustrative examples, another device for deriving an identifier encoded in a VLC signal is described. In one configuration, the device may include a processor, memory in electronic communication with the processor, and instructions stored in the memory. The instructions may be executable by the processor to capture a first part of the VLC signal; extract, from the first part of the VLC signal, a first pattern of bits representing at least a portion of the identifier encoded in the VLC signal; compare the first pattern of bits to different portions of a plurality of identifiers; and identify, based at least in part on the comparing, a subset of the plurality of identifiers as candidate matches to the identifier encoded in the VLC signal. In some examples, the instructions may also be executable by the processor to implement one or more aspects of the method described above with respect to the first set of illustrative examples.

In a fourth set of illustrative examples, a computer program product for deriving an identifier encoded in a VLC signal is described. The computer program product may include a non-transitory computer-readable medium storing instructions executable by a processor to cause a device to capture a first part of the VLC signal; extract, from the first part of the VLC signal, a first pattern of bits representing at least a portion of the identifier encoded in the VLC signal; compare the first pattern of bits to different portions of a plurality of identifiers; and identify, based at least in part on the comparing, a subset of the plurality of identifiers as candidate matches to the identifier encoded in the VLC signal. In some examples, the instructions may also be executable by the processor to cause the device to implement one or more aspects of the method described above with respect to the first set of illustrative examples.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Transmission and reception of data using VLC is described. In some examples, the described methods, systems, and devices may use rateless VLC, which is a communication method in which a light fixture may repetitively (and in some cases, continually) transmit a piece of information (e.g., an identifier) and a VLC-compatible device or devices in the vicinity of the light fixture may receive and decode transmissions of the identifier until enough of the identifier is captured to reconstruct or otherwise derive the identifier. In some cases, the entirety of the identifier may be captured. In other cases, only part of the identifier may be captured. Each repetition of the identifier may convey the same information. In practice, symbols of the identifier may be lost (erased) due to temporary outages in the VLC link (e.g., as a result of physical obstructions, or as a result of an increase in the distance between the light fixture and a receiver of the VLC-compatible device). Because of this property, the communication method may be said to be "rateless"—i.e., the number of identifiers that need to be transmitted and received in order to reconstruct or otherwise derive the identifier may vary.

The techniques described herein enable the derivation of an identifier encoded in a VLC signal to begin (and possibly finish) prior to capture of the entirety of the identifier.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
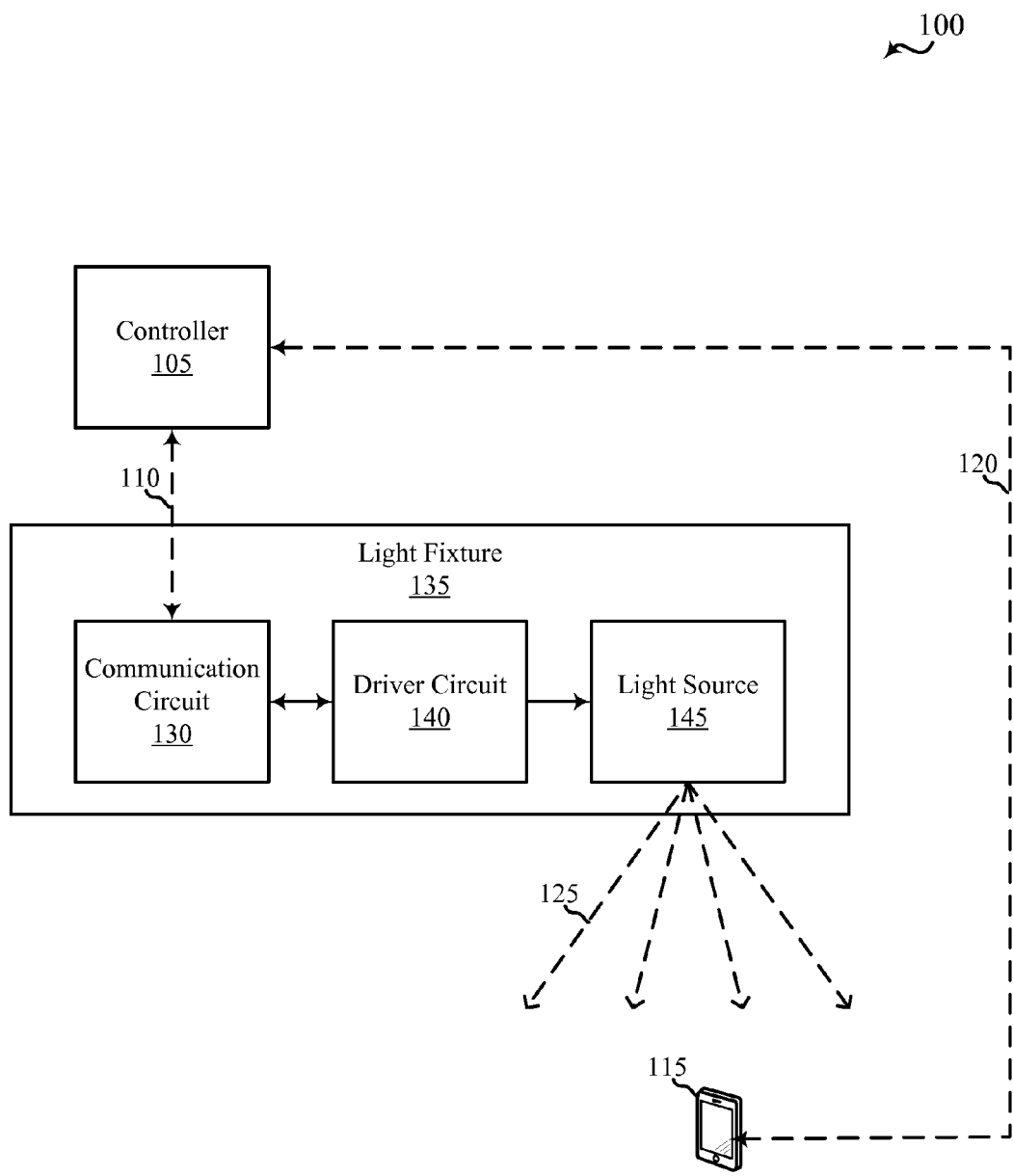
FIG. 1 is a block diagram of a VLC system 100, in accordance with various embodiments.

FIG. 1 is a block diagram of a VLC system 100. By way of example, the VLC system 100 may include a controller 105, a light fixture 135, and/or a mobile device 115. In some examples, the VLC system 100 may include any number of controllers 105, mobile devices 115, and/or light fixtures 135. In some cases, the controller 105 (or aspects of the controller 105) may be provided by the mobile device 115. In these cases, the mobile device 115 may communicate directly with the light fixture 135.

The light fixture 135 may include a communication circuit 130, a driver circuit 140, and/or a light source 145. In some examples, the light source 145 may include one or more light emitting diodes (LEDs) and/or other light emitting elements. In some configurations, a single light source 145 or commonly controlled group of light emitting elements may be provided (e.g., a single light source 145 or commonly controlled group of light emitting elements may be used for ambient illumination and VLC signal transmissions). In other configurations, the light source 145 may be replaced with multiple light sources or separately controlled groups of light emitting elements (e.g., a first light source may be used for ambient illumination, and a second light source may be used for VLC signal transmissions).

The driver circuit 140 (e.g., an intelligent ballast) may be used to drive the light source 145. In some examples, the driver circuit 140 may drive the light source 145 using a current signal and/or a voltage signal. In some configurations, some of the intelligence of the driver circuit 140 or intelligent ballast may be moved to the controller 105.

By way of example, the controller 105 may take the form of a desktop computer or wall-mounted control pad. The functions of the controller 105 may also be provided by the mobile device 115. The controller 105 may also be a switch, such as an ON/OFF/dimming switch. A user may select or input an illumination factor (e.g., a percentage of dimness) via the controller 105, which illumination factor may be provided by the controller 105 to the light fixture 135. In some examples, the controller 105 may provide the illumination factor to a communication circuit 130 of the light fixture 135. By way of example, the illumination factor may be provided to the communication circuit 130 over a power line network, a wireless local area network (WLAN; e.g., a Wi-Fi network), and/or a wireless wide area network (WWAN; e.g., a cellular network such as a Long Term Evolution (LTE) or LTE-Advanced (LTE-A) network). The network or networks over which the controller 105 and communication circuit 130 communicate provide a number of (e.g., one or more) communication links 110 between the controller 105 and the communication circuit 130.

In some examples, the controller 105 may also provide the light fixture 135 an identifier for transmission using VLC. In some examples, the controller 105 may receive status information from the light fixture 135. The status information may include, for example, a light intensity of the light source 145, a thermal performance of the light source 145, and/or an identifier of the light fixture 135.

The mobile device 115 may also take various forms, and in some examples may be a mobile phone or tablet computer. The mobile device 115 may be able to communicate over different access networks, such as other WLANs and/or WWANs. In some examples, the mobile device may communicate uni-directionally or bi-directionally with the controller 105. In some examples, the mobile device 115 may also or alternatively communicate directly with the light fixture 135. The network or networks over which the mobile device 115 and controller 105 communicate provide a number of communication links 120 between the mobile device 115 and the controller 105.

When the light fixture 135 is in an ON state, the light source 145 may provide ambient illumination 125 which may be captured by an image sensor (e.g., a camera) of the mobile device 115. The light source 145 may also make VLC signal transmissions that may be captured by the image sensor of the mobile device 115. As described herein, the illumination and/or VLC signal transmissions may be used by the mobile device 115 for navigation and/or other purposes.

Figure 2:
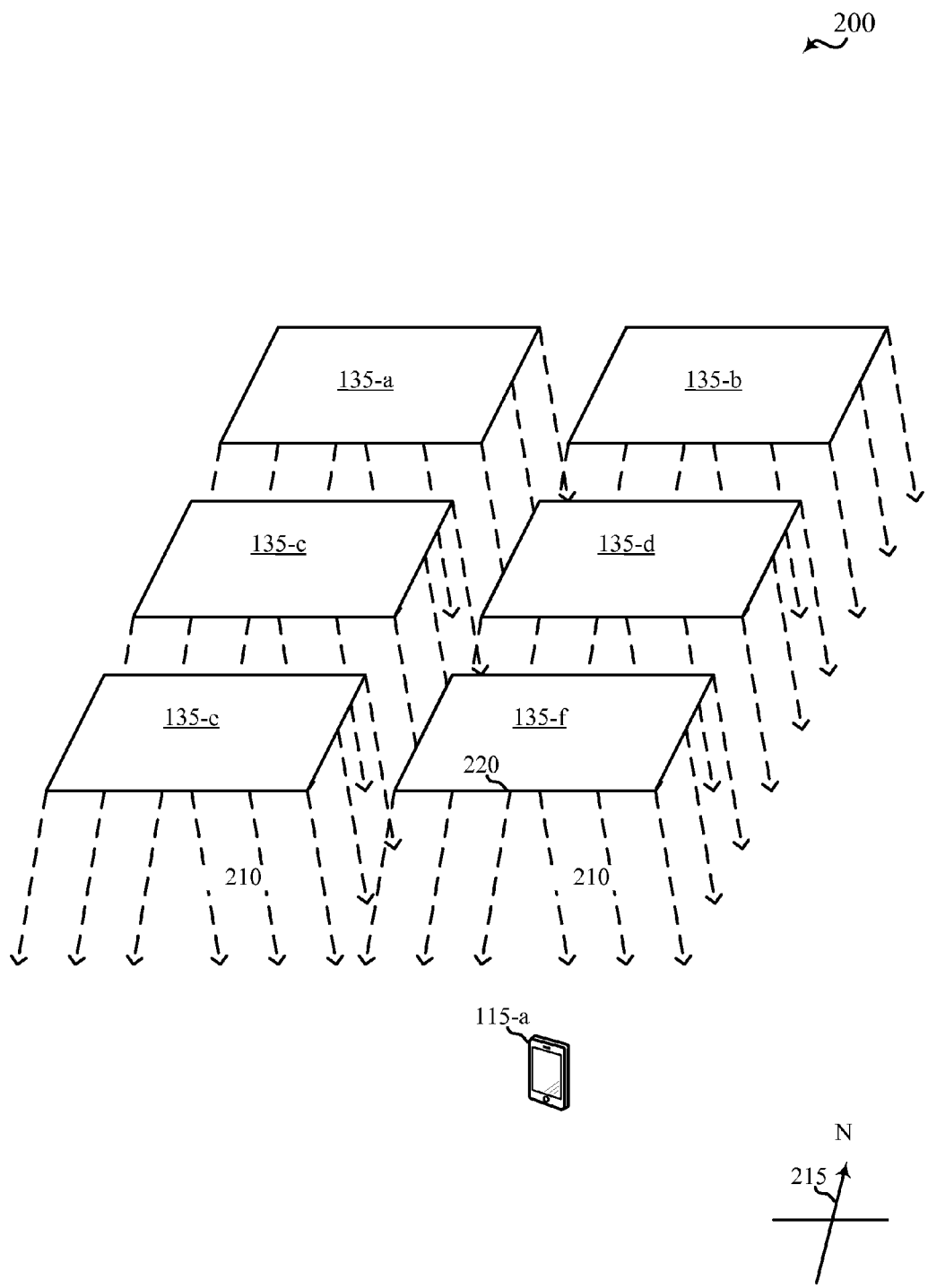
FIG. 2 is a diagram of a mobile device positioned below a number of light fixtures, in accordance with various embodiments.

Referring now to FIG. 2, a diagram 200 illustrates an example of a mobile device 115-a positioned below a number of light fixtures 135-a, 135-b, 135-c, 135-d, 135-e, and 135-f. The mobile device 115-a may in some cases be an example of the mobile device 115 described with reference to FIG. 1 The light fixtures 135-a, 135-b, 135-c, 135-d, 135-e, and 135-f may in some cases be examples of aspects of the light fixture 135 described with reference to FIG. 1. The light fixtures 135-a, 135-b, 135-c, 135-d, 135-e, and 135-f may in some examples be overhead light fixtures in a building, which overhead light fixtures may have fixed locations with respect to a reference (e.g., a global positioning system (GPS) coordinate system and/or building floor plan). In some cases, the light fixtures 135-a, 135-b, 135-c, 135-d, 135-e, and 135-f may also have fixed orientations with respect to a reference (e.g., a meridian passing through magnetic north 215).

In some examples, the mobile device 115-a may include an image sensor (e.g., a camera of the mobile device 115-a). As the mobile device 115-a moves (or is moved) under one or more of the light fixtures 135-a, 135-b, 135-c, 135-d, 135-e, and 135-f, the image sensor of the mobile device 115-a may receive light 210 emitted by one or more of the light fixtures 135-a, 135-b, 135-c, 135-d, 135-e, and 135-f and capture an image of part or all of one or more of the light fixtures 135-a, 135-b, 135-c, 135-d, 135-e, and 135-f. The captured image may include an illuminated reference axis, such as the illuminated edge 220 of the light fixture 135-f. Such illuminated edges may enable the mobile device to determine its location and/or orientation with reference to one or more of the light fixtures 135-a, 135-b, 135-c, 135-d, 135-e, and 135-f. Alternatively or additionally, the mobile device 115-a may receive, from one or more of the light fixtures 135-a, 135-b, 135-c, 135-d, 135-e, and 135-f, VLC signal transmissions that include identifiers of one or more of the light fixtures 135-a, 135-b, 135-c, 135-d, 135-e, and 135-f. The received identifier(s) may be used to generally determine a location of the mobile device 115-a with respect to the light fixtures 135-a, 135-b, 135-c, 135-d, 135-e, and 135-f, and/or to look up locations of one or more of the light fixtures 135-a, 135-b, 135-c, 135-d, 135-e, and 135-f and determine, for example, a location of the mobile device 115-a with respect to a GPS coordinate system and/or building floor plan. Additionally or alternatively, the mobile device 115-a may use the locations of one or more of the light fixtures 135-a, 135-b, 135-c, 135-d, 135-e, and 135-f, along with captured images of the light fixtures 135-a, 135-b, 135-c, 135-d, 135-e, and 135-f, to determine a more precise location and/or orientation of the mobile device 115-a.

Upon determining the location and/or orientation of the mobile device 115-a, the location and/or orientation may be used for navigation by the mobile device 115-a.

As previously described, a light source (such as the light source 145 described with reference to FIG. 1), and/or a light fixture (such as one of the light fixtures 135 described with reference to FIGS. 1 and/or 2), may transmit a VLC signal in which an identifier of the light source 145 and/or light fixture 135 may be encoded. An identifier of a light source 145 and/or light fixture 135 may be encoded in a VLC signal in various ways. For example, an identifier may be encoded in a VLC signal as a time sequence of symbols (e.g., as a pulse position modulated sequence of digital pulses, which pulses have positions within a fundamental period, and which pulse positions convey bits of information). In some cases, the fundamental period may remain constant during the transmission of the VLC signal and have a duration between 1 millisecond (ms) and 250 microseconds (μs). As another example, an identifier may be encoded in a VLC signal using frequency-shift keying modulation.

Figure 3A:
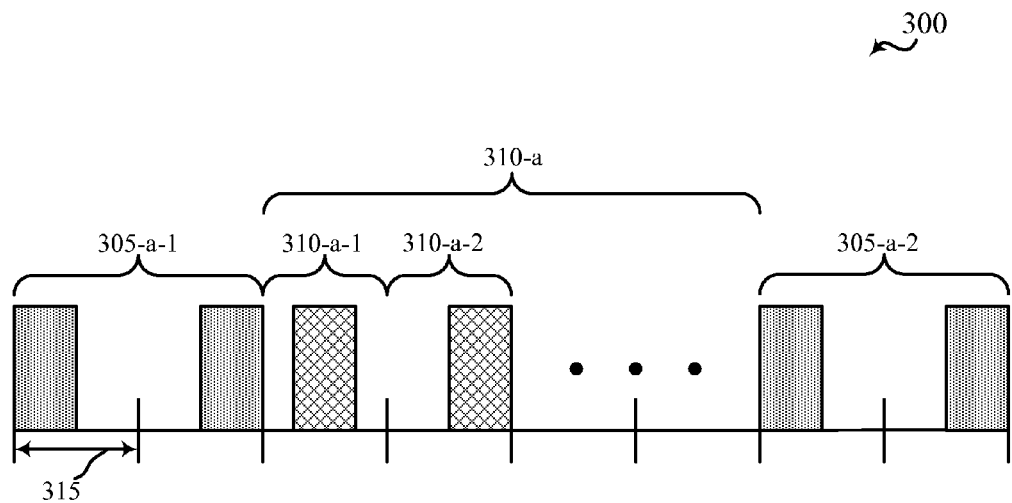
FIGS. 3A, 3B, and 3C show a number of VLC signals having different duty cycles, in accordance with various embodiments.
Figure 3B:
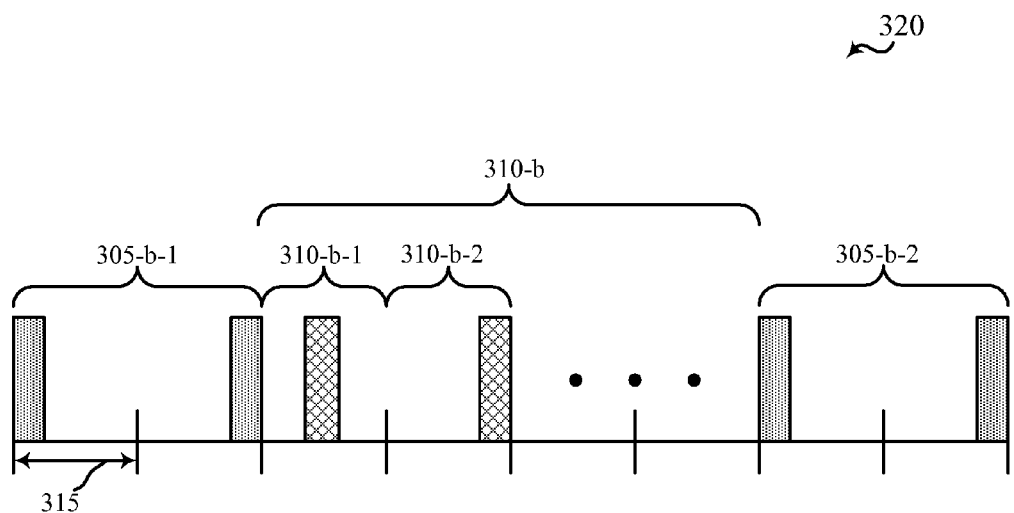
Figure 3C:
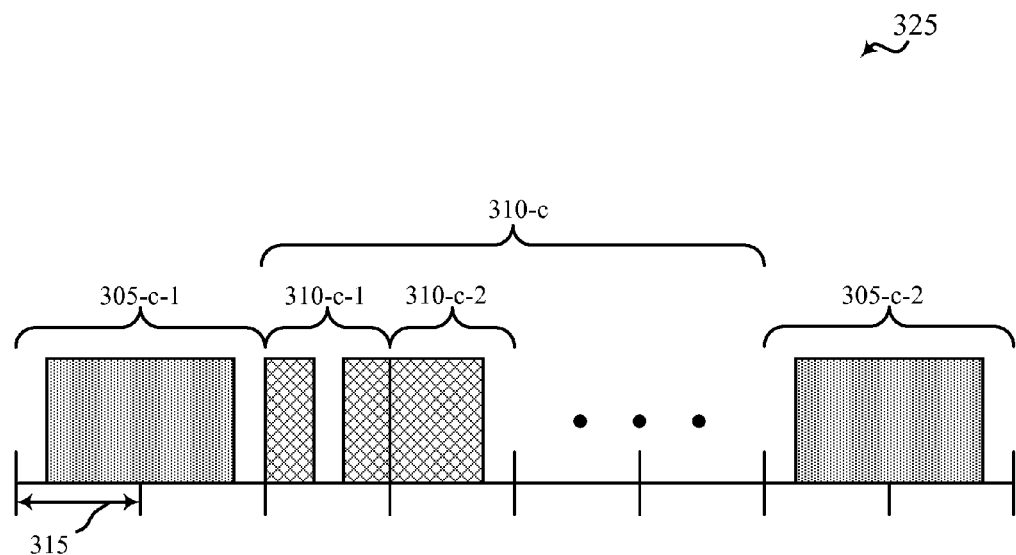

FIGS. 3A, 3B, and 3C show examples of VLC signals in which identifiers are encoded using pulse position modulation, in accordance with a number of VLC signals having different duty cycles. By way of example, the VLC signal 300 shown in FIG. 3A has a duty cycle of 50%; the VLC signal 320 shown in FIG. 3B has a duty cycle of 25%; and the VLC signal 325 shown in FIG. 3C has a duty cycle of 75%. The duty cycle with which a VLC signal 300, 320, or 325 is transmitted may depend on the percentage of dimness selected for a light source 145 and/or light fixture 135.

Turning to FIG. 3A, the VLC signal 300 may have a duty cycle of 50% and include positive polarity pulses. Each pulse may be confined to one of a number of timeslots 315. A number of pulses of the VLC signal 300 may define an instance 310-a of an identifier. By way of example, the instance 310-a of the identifier may be preceded by two consecutive pulses defining a synchronization signal 305-a-1. The first pulse of the synchronization signal 305-a-1 may be aligned with the beginning of its timeslot, and the second pulse of the synchronization signal 305-a-1 may be aligned with the end of its timeslot.

Following the pulses of the synchronization signal are a number of symbols. In the example shown, the symbols may be pulse position modulated. For example, some of the symbols (e.g., symbol 310-a-2) may define logic "0" symbols and may be aligned with the ends of their timeslots. Other symbols (e.g., symbol 310-a-1) may define logic "1" symbols and may be centered within their timeslots. As shown, a spacing in time between the two consecutive pulses of the synchronization signal 305-a-1 may differ from both 1) a spacing in time between any two consecutive pulses of the identifier 310-a, and 2) a spacing in time between a pulse of the synchronization signal 305-a-1 and a pulse of the identifier 310-a. This may enable a VLC-compatible device to detect the synchronization signal 305-a-1 from amongst the symbols of consecutive identifiers.

Following the symbols of the instance 310-a of the identifier, another instance of the identifier may be transmitted, such that instances of the identifier may be transmitted back-to-back, regardless of VLC frame boundaries. However, the next instance of the identifier may in some cases be preceded with a next instance of the synchronization signal 305-a-2.

Turning to FIG. 3B, the VLC signal 320 may have a duty cycle of 25% and include positive polarity pulses. Each pulse may be confined to one of a number of timeslots 315. A number of pulses of the VLC signal 320 may define an instance 310-b of an identifier. By way of example, the instance 310-b of the identifier may be preceded by two consecutive pulses defining a synchronization signal 305-b-1. Similarly to the VLC signal 300 having a duty cycle of 50%, the first pulse of the synchronization signal 305-b-1 may be aligned with the beginning of its timeslot, and the second pulse of the synchronization signal 305-b-1 may be aligned with the end of its timeslot.

Following the pulses of the synchronization signal are a number of symbols. In the example shown, the symbols may be pulse position modulated. For example, some of the symbols (e.g., symbol 310-b-2) may define logic "0" symbols and may be aligned with the ends of their timeslots. Other symbols (e.g., symbol 310-b-1) may define logic "1" symbols and may be centered within their timeslots. As shown, a spacing in time between the two consecutive pulses of the synchronization signal 305-b-1 may differ from both 1) a spacing in time between any two consecutive pulses of the identifier 310-b, and 2) a spacing in time between a pulse of the synchronization signal 305-b-1 and a pulse of the identifier 310-b. This may enable a VLC-compatible device to detect the synchronization signal 305-b-1 from amongst the symbols of consecutive identifiers.

Following the symbols of the instance 310-b of the identifier, another instance of the identifier may be transmitted, such that instances of the identifier may be transmitted back-to-back, regardless of VLC frame boundaries. However, the next instance of the identifier may in some cases be preceded with a next instance of the synchronization signal 305-b-2.

Turning to FIG. 3C, the VLC signal 325 may have a duty cycle of 75% and include negative polarity pulses. Each pulse may be confined to one of a number of timeslots 315. A number of pulses of the VLC signal 325 may define an instance 310-c of an identifier. By way of example, the instance 310-c of the identifier may be preceded by two consecutive pulses defining a synchronization signal 305-c-1. Similarly to the VLC signals 300, 320 having duty cycles of 50% and 25%, the first pulse of the synchronization signal 305-c-1 may be aligned with the beginning of its timeslot, and the second pulse of the synchronization signal 305-c-1 may be aligned with the end of its timeslot. However, instead of the pulses being positive polarity pulses, the pulses of the VLC signal 325 may be negative polarity pulses. One reason for the switch in polarity is to prevent the spacing between the pulses from becoming less than (or indistinguishable from) the spacing between the pulses of any two consecutive symbols of the identifier 310-c.

Following the pulses of the synchronization signal are a number of symbols. In the example shown, the symbols may be pulse position modulated. For example, some of the symbols (e.g., symbol 310-c-2) define logic "0" symbols and may be aligned with the ends of their timeslots. Other symbols (e.g., symbol 310-c-1) define logic "1" symbols and may be centered within their timeslots. As shown, a spacing in time between the two consecutive pulses of the synchronization signal 305-c-1 may differ from both 1) a spacing in time between any two consecutive pulses of the identifier 310-c, and 2) a spacing in time between a pulse of the synchronization signal 305-c-1 and a pulse of the identifier 310-c. This may enable a VLC-compatible device to detect the synchronization signal 305-c-1 from amongst the symbols of consecutive identifiers.

Following the symbols of the instance 310-c of the identifier, another instance of the identifier may be transmitted, such that instances of the identifier may be transmitted back-to-back, regardless of VLC frame boundaries. However, the next instance of the identifier may in some cases begin with a next instance of the synchronization signal 305-c-2.

Figure 4:
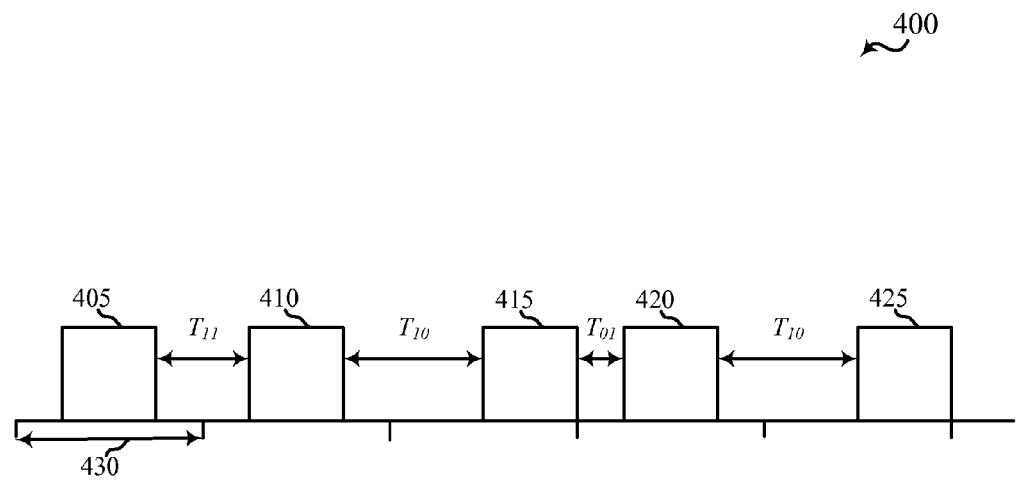
FIG. 4 illustrates an example of pulse position modulated pulses transmitted using a VLC signal, in accordance with various embodiments.

FIG. 4 illustrates an example 400 of pulse position modulated pulses transmitted using a VLC signal. A device that receives the VLC signal may extract a pattern of bits from the VLC signal by attempting to demodulate each pulse 405, 410, 415, 420, 425, in each fundamental period (e.g., the fundamental period 430), to extract one or more information bits from the pulse. In the case of binary pulses, this may amount to attempting to extract a logic "1" or a logic "0" from each pulse. However, because the start of a time slot of the fundamental period (e.g., the timeslot 315 in FIG. 3A) may be unknown, pulse position modulated pulses may not be demodulated individually. Instead, the pulses may be demodulated by observing three consecutive pulses and using the fact that inter-pulse time intervals can assume a discrete finite set of values. Equivalently, information bits may be considered encoded in the inter-pulse time intervals via differential encoding. For example, consider the capture of the pulses 405, 410, 415, 420, and 425 shown in FIG. 4 by a VLC-receiving device (e.g., one of the mobile devices 115 described with reference to FIGS. 1 and/or 2). Upon the capture of the first three pulses, and a measurement or computation of their inter-pulse times (e.g., $T_{11}$ and $T_{10}$), other pulses in the VLC signal may be demodulated. In some embodiments, an inter-pulse time interval may be reserved to convey the receipt of a synchronization signal.

Figure 5:
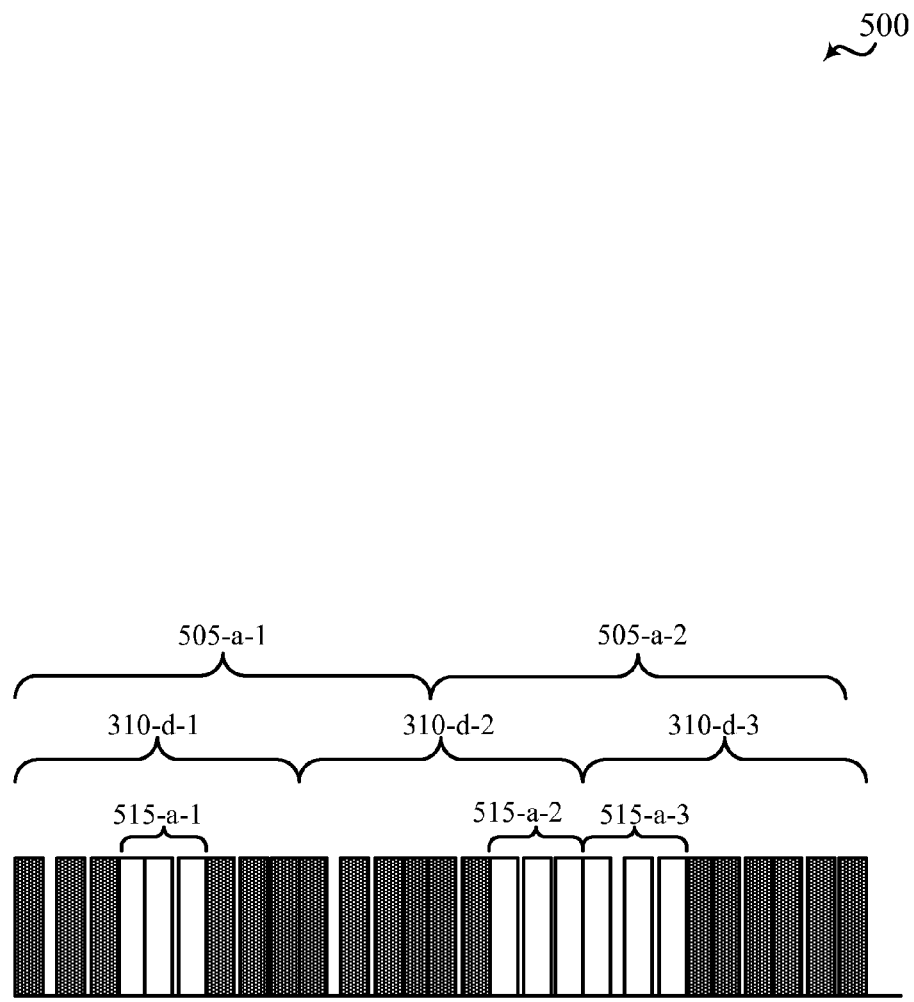
FIG. 5 illustrates a VLC signal in which instances of an identifier, preceded by synchronization signals, may be transmitted back-to-back across two or more image capture frames of a VLC-compatible device, in accordance with various embodiments.

FIG. 5 illustrates a VLC signal 500 in which instances 310-d-1, 301-d-2, 310-d-3 of an identifier, preceded by synchronization signals, may be transmitted back-to-back across two or more image capture frames 505-a-1, 505-a-2 of a VLC-compatible device (e.g., two or more image capture frames of a mobile device such as one of the mobile devices 115 described with reference to FIGS. 1 and/or 2). In some examples, temporary outages in a VLC link due to physical obstructions of field of view, and/or longer distances between a VLC-compatible device and a light source, as well as other effects, may result in a fading process. The fading process may result in some of the symbols of an identifier (or even a synchronization signal associated with an identifier) not being detected by the VLC-compatible device. This is illustrated in FIG. 5 by shading of the symbols of an identifier that are not detected by a particular VLC-compatible device.

The fading process may sometimes be geometry-dependent (e.g., a result of the angle at which a light source subtends at a receiver or image sensor). That is, the orientation of the image sensor may tend to determine which symbols are erased. This may result in a VLC-compatible device being able to detect only the symbols transmitted at particular times with respect to a frame duration of an image capture frame of an image sensor receiving the VLC signal.

By way of example, FIG. 5 illustrates different sets of symbols 515-a-1, 515-a-2 being detected by an image sensor from one image capture frame 505-a-1 to another image capture frame 505-a-2. A VLC-compatible device may also be moved closer to a light source to improve its VLC signal reception, thereby increasing the size of the detectable window so that it includes additional symbols (e.g., the sets of symbols 515-a-2 and 515-a-3).

Fading processes may affect the transmission of an identifier encoded in a VLC signal regardless of the method used to encode the identifier in the VLC signal. Techniques for deriving an identifier encoded in a VLC signal after capture of one or more parts (e.g., less than all) of the VLC signal are therefore described.

Figure 6:
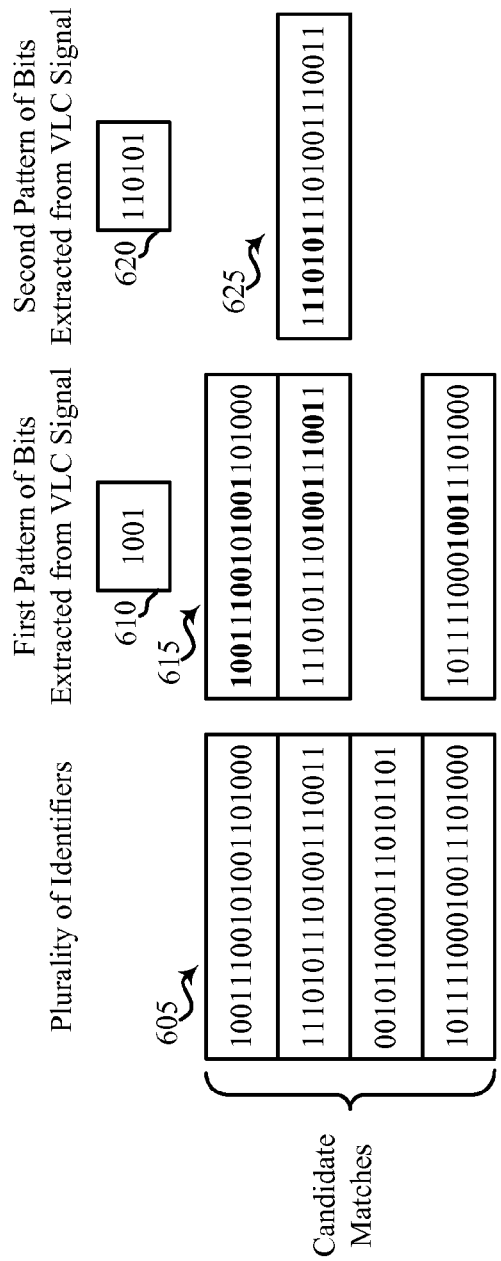
FIG. 6 illustrates a first example of how to derive an identifier encoded in a VLC signal, in accordance with various embodiments.
Figure 7:
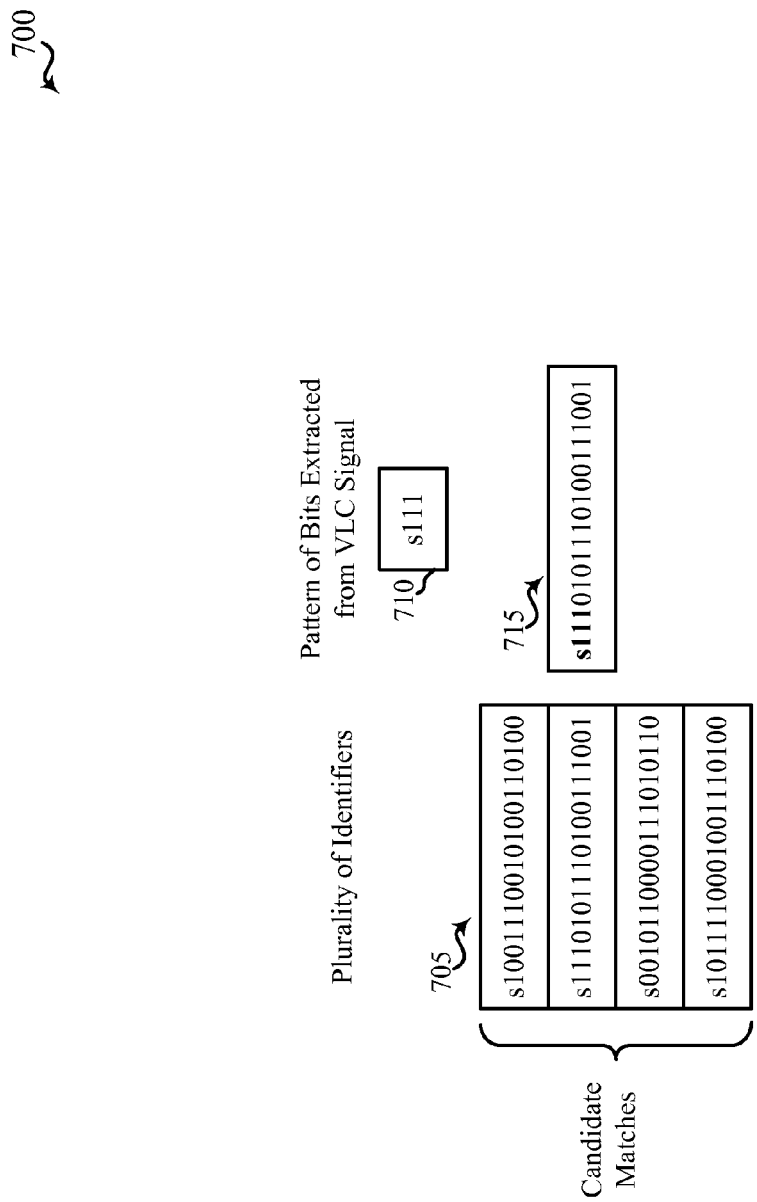
FIG. 7 illustrates a second example of how to derive an identifier encoded in a VLC signal, in accordance with various embodiments.

FIGS. 6 & 7 provide examples of how an identifier encoded in a VLC signal may be derived, regardless of the method used to encode the identifier in the VLC signal. Turning now to FIG. 6, a first example 600 of how to derive an identifier encoded in a VLC signal is illustrated. In accordance with the example 600, a plurality of identifiers 605 is shown. Each of the identifiers in the plurality of identifiers 605 may include a sequence of bits (e.g., a sequence of logic "1"s and logic "0"s) and may uniquely or semi-uniquely identify a light fixture (e.g., one of the light fixtures 135 described with reference to FIGS. 1 and/or 2).

By way of example, the plurality of identifiers 605 is shown to include four identifiers. However, in a given application (e.g., inside a building), the plurality of identifiers 605 may include dozens, hundreds, or even thousands of identifiers (e.g., a number of identifiers that is greater than or equal to a number of light fixtures in a venue).

The second column shown in FIG. 6 includes a pattern of bits 610 extracted from part of a VLC signal captured by a mobile device (e.g., one of the mobile devices 115 described with reference to FIGS. 1 and/or 2). The pattern of bits 610 represents a portion of an identifier encoded in the VLC signal. In some examples, the pattern of bits 610 may include consecutive bits of the identifier. In other examples, the pattern of bits 610 may include at least two nonconsecutive subsets of bits of the identifier.

The pattern of bits 610 may be compared to different portions of the plurality of identifiers 605. In some examples, the comparing may be performed by programmatically sliding a comparison window (e.g., a comparison window having a size equal to the number of bits in the pattern of bits 610) with respect to each of the plurality of identifiers 605. Based at least in part on the comparing, a subset 615 of the plurality of identifiers may be identified as candidate matches to the identifier encoded in the VLC signal. The bits in the candidate matches are depicted in bold in FIG. 6.

The third column in FIG. 6 includes an additional pattern of bits 620 extracted from an additional part of the VLC signal captured by a mobile device. In some examples, the pattern of bits 610 may be captured during a first capture frame of a rolling shutter image sensor, and the additional pattern of bits 620 may be captured during a second capture frame of the rolling shutter image sensor. The additional pattern of bits 620 may represent a same or different portion of the identifier encoded in the VLC signal, and may include a same or different number of bits (e.g., as compared to the pattern of bits 610). By way of example, the additional pattern of bits 620 is shown to represent a different portion of the identifier and have a different number of bits (e.g., as compared to the pattern of bits 610).

Similarly to how the pattern of bits 610 was compared to different portions of the plurality of identifiers 605, the additional pattern of bits 620 may be compared to different portions of the subset 615 of the plurality of identifiers. Based at least in part on the comparing, a subset 625 of the plurality of identifiers may be identified as candidate matches to the identifier encoded in the VLC signal. Because the subset 625 contains one identifier, the one identifier may be identified as the identifier encoded in the VLC signal.

The method of deriving an identifier encoded in a VLC signal, described with reference to the example 600, can be advantageous in some contexts because it enables identification of an identifier encoded in a VLC signal to begin (and possibly finish) prior to capture of the entirety of the identifier.

In some examples, the comparisons and identifications performed as part of the example 600 may be performed by a mobile device 115 that captures a part or parts of a VLC signal. In other examples, the comparisons and identifications performed as part of the example 600 may be performed partly or wholly by a remote server that is in communication with a mobile device 115 that captures a part or parts of a VLC signal (e.g., by a remote server in communication with the mobile device 115 over an out-of-band radio frequency channel such as a channel of a wireless local area network (WLAN) or a channel of a wireless wide area network (WWAN)). In the latter examples, a mobile device 115 may transmit patterns of bits to the remote server and receive candidate matches, indications that additional parts of a VLC signal need to be captured, and/or information related to a matched identifier (e.g., a location of a light fixture 135) from the remote server.

Turning now to FIG. 7, a second example 700 of how to derive an identifier encoded in a VLC signal is illustrated. In accordance with the example 700, a plurality of identifiers 705 is shown. Each of the identifiers in the plurality of identifiers 705 may include a sequence of bits (e.g., a sequence of logic "1"s and logic "0"s) and may uniquely or semi-uniquely identify a light fixture (e.g., one of the light fixtures 135 described with reference to FIGS. 1 and/or 2). By way of example, the plurality of identifiers 705 is shown to include four identifiers. However, in a given application (e.g., inside a building), the plurality of identifiers 705 may include dozens, hundreds, or even thousands of identifiers (e.g., a number of identifiers that is greater than or equal to a number of light fixtures in a venue). Also by way of example, each of the plurality of identifiers 705 is shown to include a synchronization signal, labeled as "s".

The second column shown in FIG. 7 includes a pattern of bits 710 extracted from part of a VLC signal captured by a mobile device (e.g., one of the mobile devices 115 described with reference to FIGS. 1 and/or 2). The pattern of bits 710 represents a portion of an identifier encoded in the VLC signal. In some examples, the pattern of bits 710 may include consecutive bits of the identifier. In other examples, the pattern of bits 710 may include at least two nonconsecutive subsets of bits of the identifier. By way of example, the pattern of bits 710 is shown to include a synchronization signal "s". In other examples, the pattern of bits 710 may not include the synchronization signal "s".

The pattern of bits 710 may be compared to different portions of the plurality of identifiers 705. Because the pattern of bits 710 includes the synchronization signal "s", comparison of the pattern of bits 710 to each of the identifiers in the plurality of identifiers 705 may be restricted based at least in part on a relationship of the synchronization signal to the pattern of bits 710. Based at least in part on the comparing, a subset 715 of the plurality of identifiers may be identified as candidate matches to the identifier encoded in the VLC signal. The bits in the candidate matches are depicted in bold in FIG. 7. Because the subset 715 contains one identifier, the one identifier may be identified as the identifier encoded in the VLC signal.

The method of deriving an identifier encoded in a VLC signal, described with reference to the example 700, can be advantageous in some contexts because it enables identification of an identifier encoded in a VLC signal to begin (and possibly finish) prior to capture of the entirety of the identifier.

In some examples, the comparisons and identifications performed as part of the example 700 may be performed by a mobile device 115 that captures a part or parts of a VLC signal. In other examples, the comparisons and identifications performed as part of the example 700 may be performed partly or wholly by a remote server that is in communication with a mobile device 115 that captures a part or parts of a VLC signal (e.g., by a remote server in communication with the mobile device 115 over an out-of-band radio frequency channel such as a channel of a wireless local area network (WLAN) or a channel of a wireless wide area network (WWAN)). In the latter examples, a mobile device 115 may transmit patterns of bits to the remote server and receive candidate matches, indications that additional parts of a VLC signal need to be captured, and/or information related to a matched identifier (e.g., a location of a light fixture 135) from the remote server.

Figure 8:
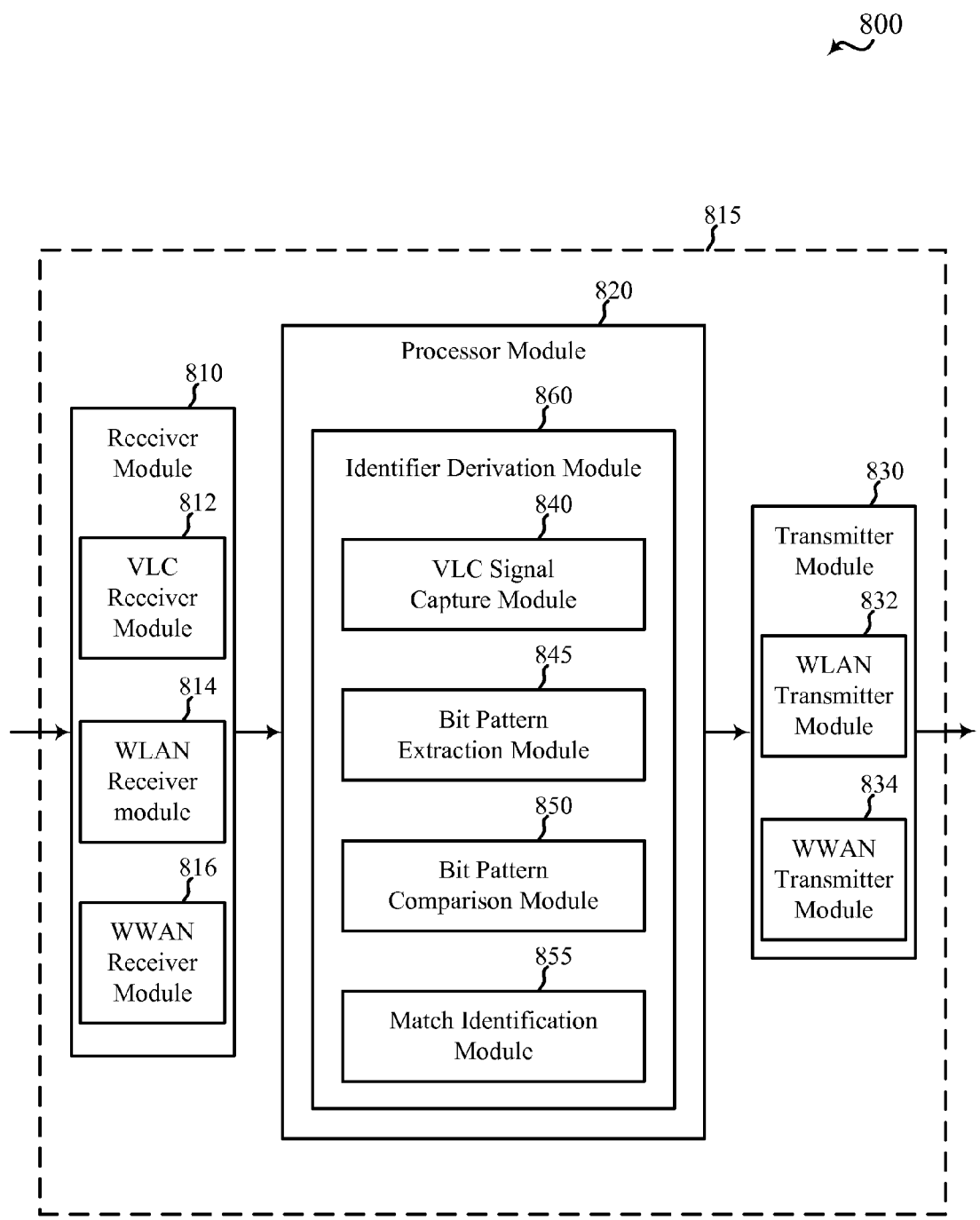
FIG. 8 shows a block diagram of a device for deriving an identifier encoded in a VLC signal, in accordance with various embodiments.

Referring now to FIG. 8, a block diagram 800 illustrates an example of a device 815 for deriving an identifier encoded in a VLC signal. In some examples, the identifier may be an identifier of a light fixture, such as an identifier of one of the light fixtures 135 described with reference to FIGS. 1 and/or 2. The device 815 may be an example of aspects of one or more of the mobile devices 115 described with reference to FIGS. 1 and/or 2. The device may in some cases be a processor. The device 815 may include a receiver module 810, a processor module 820, and/or a transmitter module 830. Each of these components may be in communication with each other.

The components of the device 815 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 810 may include a VLC receiver module 812. The VLC receiver module 812 may be used to receive a VLC signal and in some examples may include a photo detector (PD) or array of PDs (e.g., a complementary metal-oxide-semiconductor (CMOS) image sensor (e.g., a camera)). In some examples, the image sensor may include a rolling shutter image sensor. The VLC receiver module 812 may be used to receive, for example, one or more VLC signals in which one or more identifiers are encoded. The receiver module 810 may also include alternate and/or additional receiver modules, such as one or more radio frequency (RF) receiver modules (e.g., a wireless local area network (WLAN) receiver module 814 (e.g., a Wi-Fi receiver module), a wireless wide area network (WWAN) receiver module 816 (e.g., a cellular receiver module such as an LTE/LTE-A receiver module), a Bluetooth (BT) receiver module, and/or a BT Low Energy (BTLE) receiver module). A WLAN receiver module 814, WWAN receiver module 816, BT receiver module, and/or BTLE receiver module may be used to receive, for example, various types of data and/or control signals (i.e., transmissions) over one or more communication links of a wireless communication system.

In some examples, the transmitter module 830 may include one or more RF transmitter modules (e.g., a WLAN transmitter module 832 (e.g., a Wi-Fi transmitter module), a WWAN transmitter module 834 (e.g., a cellular transmitter module such as an LTE/LTE-A transmitter module), a BT transmitter module, and/or a BTLE transmitter module). A WLAN transmitter module 832, WWAN transmitter module 834, BT transmitter module, and/or BTLE transmitter module may be used to transmit, for example, various types of data and/or control signals (i.e., transmissions) over one or more communication links of a wireless communication system.

The processor module 820 may be used to manage various functions related to VLC and/or RF communications. In some examples, the processor module 820 may include an identifier derivation module 860. The identifier derivation module 860 may include a VLC signal capture module 840, a bit pattern extraction module 845, a bit pattern comparison module 850, and/or a match identification module 855. Each of these components may be in communication with each other.

In some examples, the VLC signal capture module 840 may be used to capture part of a VLC signal received via the VLC receiver module 812. The part of the VLC signal may be received from a light source 145 (e.g., one or more LEDs of a light fixture 135). In some cases, the part of the VLC signal may be captured at a low exposure setting of the VLC receiver module 812, so that high frequency pulses are not attenuated.

In some examples, the bit pattern extraction module 845 may be used to extract, from a part of the VLC signal, a pattern of bits representing at least a portion of the identifier encoded in the VLC signal. In cases where the identifier is encoded in the VLC signal using pulse position modulation, the pattern of bits may be extracted by demodulating each pulse, in each fundamental period, to extract one or more information bits. In some examples, the pattern of bits may include consecutive bits of the identifier. In other examples, the pattern of bits may include at least two nonconsecutive subsets of bits of the identifier.

In some examples, capturing part of the VLC signal may include capturing part of the VLC signal as illuminated portions of at least one image. The illuminated portions of the at least one image may be captured using a rolling shutter image sensor of the VLC receiver module 812. In these examples, extracting the pattern of bits may include extracting a pattern of pixel brightness values from the at least one image.

In some examples, the VLC signal may include multiple instances of the identifier. In these examples, the extracted pattern of bits may include part of a first instance of the identifier. In some cases, the extracted pattern of bits may also include part of a second instance of the identifier.

In some examples, the bit pattern comparison module 850 may be used to compare a pattern of bits to different portions of a plurality of identifiers. In some examples, each of the plurality of identifiers may correspond to a different VLC-enabled light source. In some examples, the comparing may include programmatically sliding a comparison window with respect to each of the plurality of identifiers.

In some examples, capturing part of the VLC signal may include capturing a synchronization signal encoded in the VLC signal. In these examples, the comparison of a pattern of bits to different portions of a plurality of identifiers may be restricted based at least in part on a relationship of the synchronization signal to the pattern of bits. An example of such a restriction is described in further detail with reference to FIG. 7.

In some examples, the plurality of identifiers may be associated with a venue. In these examples, the device 815 may receive the plurality of identifiers from a database associated with the venue. In some cases, the database may be received over a network (e.g., over a WLAN via the WLAN receiver module 814 and/or over a WWAN via the WWAN receiver module 816).

In some examples, the match identification module 855 may be used to identify, based at least in part on the comparing performed by the bit pattern comparison module 850, a subset of the plurality of identifiers as candidate matches for the identifier encoded in the VLC signal.

Figure 9:
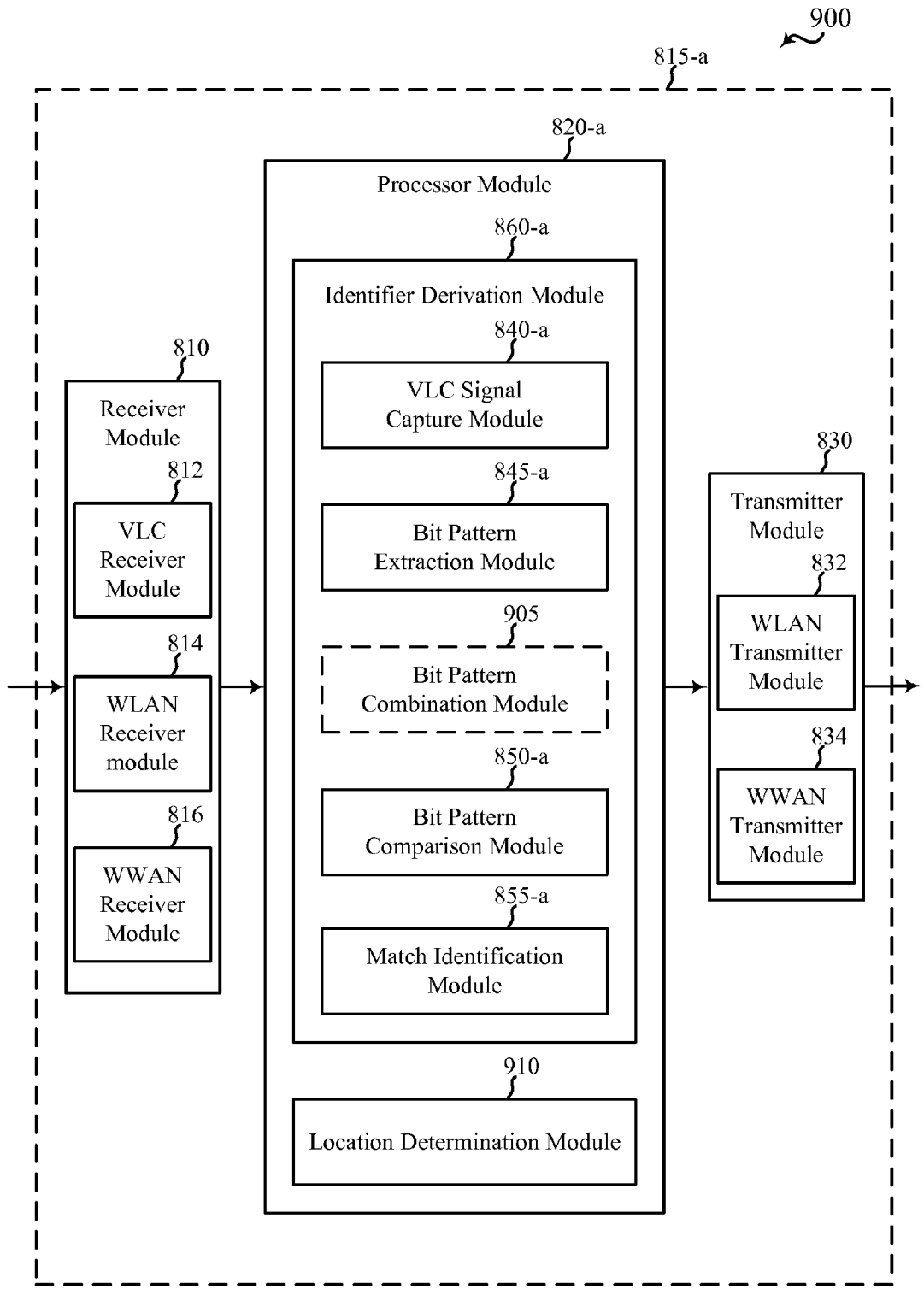
FIG. 9 shows a block diagram of a device for deriving an identifier encoded in a VLC signal, in accordance with various embodiments.

Referring now to FIG. 9, a block diagram 900 illustrates an example of a device 815-a for deriving an identifier encoded in a VLC signal. In some examples, the identifier may be an identifier of a light fixture, such as an identifier of one of the light fixtures 135 described with reference to FIGS. 1 and/or 2. The device 815-a may be an example of aspects of one or more of the mobile devices 115 described with reference to FIGS. 1 and/or 2. The device may in some cases be a processor. The device 815-a may include a receiver module 810, a processor module 820-a, a location determination module 910, and/or a transmitter module 830. Each of these components may be in communication with each other.

The components of the device 815-a may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 810 and the transmitter module 830 may be configured as described with reference to FIG. 8.

The processor module 820-a may be used to manage various functions related to VLC and/or RF communications. In some examples, the processor module 820-a may be an example of the processor module 820 described with reference to FIG. 8. In some examples, the processor module 820-a may include an identifier derivation module 860-a and/or a location determination module 910. In some examples, the identifier derivation module 860-a may include a VLC signal capture module 840-a, a bit pattern extraction module 845-a, a bit pattern combination module 905, a bit pattern comparison module 850-a, and/or a match identification module 855-a. Each of these components may be in communication with each other.

In some examples, the VLC signal capture module 840-a may be used to capture part of a VLC signal received via the VLC receiver module 812. The part of the VLC signal may be received from a light source 145 (e.g., one or more LEDs of a light fixture 135). In some cases, the part of the VLC signal may be captured at a low exposure setting of the VLC receiver module 812, so that high frequency pulses are not attenuated.

In some examples, the bit pattern extraction module 845-a may be used to extract, from a part of the VLC signal, a pattern of bits representing at least a portion of the identifier encoded in the VLC signal. In cases where the identifier is encoded in the VLC signal using pulse position modulation, the pattern of bits may be extracted by demodulating each pulse, in each fundamental period, to extract one or more information bits. In some examples, the pattern of bits may include consecutive bits of the identifier. In other examples, the pattern of bits may include at least two nonconsecutive subsets of bits of the identifier.

In some examples, capturing part of the VLC signal may include capturing part of the VLC signal as illuminated portions of at least one image. The illuminated portions of the at least one image may be captured using a rolling shutter image sensor of the VLC receiver module 812. In these examples, extracting the pattern of bits may include extracting a pattern of pixel brightness values from the at least one image.

In some examples, the VLC signal may include multiple instances of the identifier. In these examples, the extracted pattern of bits may include part of a first instance of the identifier. In some cases, the extracted pattern of bits may also include part of a second instance of the identifier.

In some examples, the bit pattern combination module 905 may be used to combine an additional pattern of bits (e.g., a second pattern of bits) extracted from a captured additional part of the VLC signal (e.g., a second part of the VLC signal) with a pattern of bits (e.g., a first pattern of bits) extracted from one or more previously captured parts of the VLC signal (e.g., a first part of the VLC signal).

In some examples, the bit pattern comparison module 850-*a* may be used to compare a pattern of bits (or a combined pattern of bits) to different portions of a plurality of identifiers, or to different portions of a subset of the plurality of identifiers. In some examples, the bit pattern comparison module 850-*a* may be programmed to compare a first pattern of bits extracted from a first part of the VLC signal to different portions of a plurality of identifiers, and to compare an additional pattern of bits (e.g., a second pattern of bits extracted from a second part of the VLC signal and/or a combined pattern of bits) to a subset of the plurality of identifiers. In some examples, each of the plurality of identifiers may correspond to a different VLC-enabled light source. In some examples, the comparing may include programmatically sliding a comparison window with respect to each of the plurality of identifiers.

In some examples, capturing part of the VLC signal may include capturing a synchronization signal encoded in the VLC signal. In these examples, the comparison of a pattern of bits to different portions of a plurality of identifiers may be restricted based at least in part on a relationship of the synchronization signal to the first pattern of bits. An example of such a restriction is described in further detail with reference to FIG. 7.

In some examples, the plurality of identifiers may be associated with a venue. In these examples, the device 815-*a* may receive the plurality of identifiers from a database associated with the venue. In some cases, the database may be received over a network (e.g., over a WLAN via the WLAN receiver module 814 and/or over a WWAN via the WWAN receiver module 816).

In some examples, the match identification module 855-*a* may be used to identify, based at least in part on the comparing performed by the bit pattern comparison module 850-*a*, a subset of the plurality of identifiers as candidate matches to the identifier encoded in the VLC signal. When the subset of the plurality of identifiers contains one (e.g., only one) of the plurality of identifiers, the match identification module 855-*a* may identify the one of the plurality of identifiers as the identifier encoded in the VLC signal. When the subset of the plurality identifiers contains more than one of the plurality of identifiers, the match identification module 855-*a* may cause the VLC signal capture module 840-*a* to capture an additional part of the VLC signal, and each of the VLC signal capture module 840-*a* the bit pattern extraction module 845-*a*, the bit pattern combination module 905, the bit pattern comparison module 850-*a*, and the match identification module 855-*a* may perform their operation(s) again.

In some examples, the location determination module 910 may be used to determine a location of a device that transmits a VLC signal (e.g., a location of a light source 145 and/or light fixture 135) based at least in part on an identifier encoded in the VLC signal. In some examples, the location determination module 910 may also be used to determine a location of the device 815-*a* based at least in part on the location of a device that transmits the VLC signal. In some examples, the location determination module 910 may be used to determine the locations of a plurality of devices that transmit VLC signals, and determine the location of the device 815-*a* based at least in part on the determined locations of the plurality of devices. In some examples, the device 815-*a* and/or processor module 820-*a* may include a navigation module that uses a determined location of the device 815-*a* with respect to one or more determined locations of one or more devices that transmit VLC signals to implement a navigation function.

Figure 10:
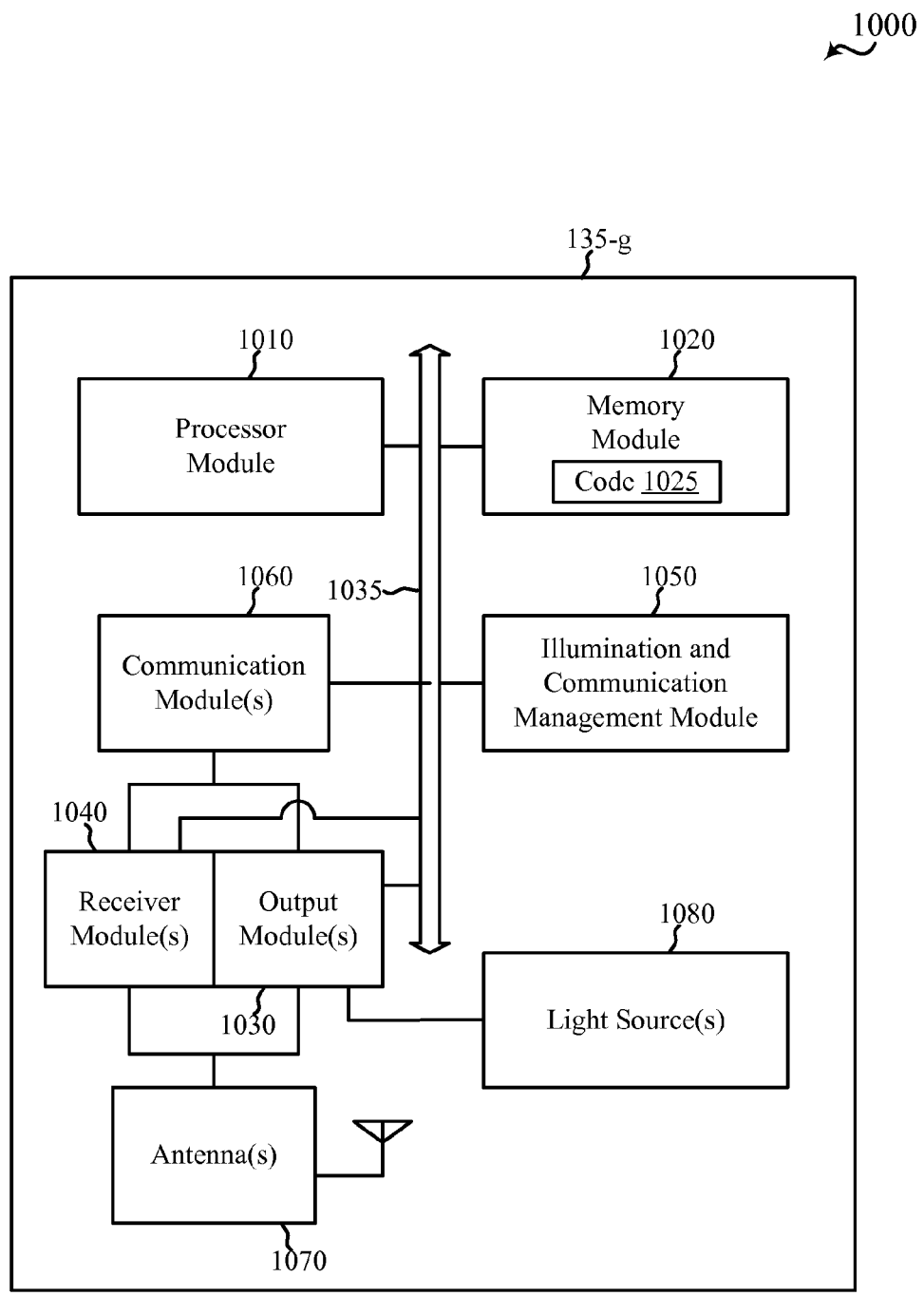
FIG. 10 is a block diagram illustrating an example of a light fixture capable of transmitting an identifier using VLC, in accordance with various embodiments.

FIG. 10 is a block diagram 1000 illustrating an example of a light fixture 135-*g* capable of transmitting an identifier using VLC. The light fixture 135-*g* may be an example of aspects of one or more of the light fixtures 135 described with reference to FIGS. 1 and/or 2.

The light fixture 135-*g* may include a processor module 1010, a memory module 1020, an illumination and communication management module 1050, one or more output modules (represented by output module(s) 1030), one or more receiver modules (represented by receiver module(s) 1040), and one or more light sources (represented by light source(s) 1080). Each of these components may be in communication with each other, directly or indirectly, over one or more buses 1035. In some examples, part or all of the processor module 1010, the memory module 1020, the illumination and communication management module 1050, and/or the output module(s) 1030 may function as a driver circuit 140 or intelligent ballast for the light source(s) 1080. In some examples, the light source(s) 1080 may include one or more LEDs.

The memory module 1020 may include random access memory (RAM) and/or read-only memory (ROM). The memory module 1020 may store computer-readable, computer-executable code 1025 containing instructions that are configured to, when executed, cause the processor module 1010 to perform various functions for driving the light source(s) 1080 and/or transmitting an identifier from the light source(s) 1080 using VLC. Alternatively, the code 1025 may not be directly executable by the processor module 1010 but be configured to cause the light fixture 135-*g* (e.g., when compiled and executed) to perform various of the functions described herein.

The processor module 1010 may include an intelligent hardware device, e.g., a CPU, such as an ARM® based processor or those made by Intel® Corporation or AMD®, a microcontroller, an ASIC, etc. The processor module 1010 may process information received through the receiver module(s) 1040 and/or configure and/or provide information to the output module(s) 1030. The processor module 1010 may handle, alone or in connection with the illumination and communication management module 1050, various aspects pertaining to driving one or more of the light source(s) 1080 for purposes of providing illumination and/or communicating using VLC.

In some examples, the output module(s) 1030 may include a driver module and/or a transmitter module. The driver module may provide a current signal, voltage signal, and/or other signal for modulating one or more of the light intensity of one or more of the light source(s) 1080. In some examples, the output module(s) 1030 may include the light source(s) 1080. In some examples, the transmitter module may include a power line transmitter module and/or a WLAN transmitter module (e.g., a Wi-Fi transmitter module). The transmitter module may also include alternate and/or additional transmitter modules, such as a WWAN transmitter module (e.g., a cellular transmitter module such as an LTE/LTE-A transmitter module), a BT transmitter module, and/or a BTLE transmitter module. When included, the transmitter module may be used to transmit, for example, status information to a user interface provided by a mobile device 115 (e.g., a mobile phone or tablet computer) or controller (e.g., a desktop computer or wall-mounted control pad). The status information may in some cases include a light intensity of the light source(s) 1080, a thermal performance of the light source(s) 1080, and/or an identifier of the light fixture 135-*g*. In some examples, the processor module 1010 and/or illumination and communication management module 1050 may communicate directly with the transmitter module(s) of the output module(s) 1030. In some examples, the processor module 1010 and/or illumination and communication management module 1050 may communicate with the transmitter module(s) of the output module(s) 1030 via one or more of communication module(s) 1060. In some configurations, the output module(s) 1030 may transmit information and/or signals via the antenna(s) 1070 and/or over a power line network.

In some examples, the receiver module(s) 1040 may include a power line receiver module and/or a WLAN receiver module (e.g., a Wi-Fi receiver module). The receiver module may also include alternate and/or additional receiver modules, such as a WWAN receiver module (e.g., a cellular receiver module such as an LTE/LTE-A receiver module), a BT receiver module, and/or a BTLE receiver module. The receiver module may be used to receive, for example, command and/or control signals from a light switch located at the light fixture 135-*g* or on a wall, or from a user interface provided by a mobile device 115 or controller 105. The commands and/or control signals may in some cases include an illumination factor, such as a percentage of dimness for setting or adjusting a light intensity of one or more light source(s) 1080, or an identifier of the light fixture 135-*g*. In some configurations, the receiver module(s) 1040 may receive information and/or signals via the antenna(s) 1070 and/or over a power line network.

By way of example, the illumination and communication management module 1050 may be a component of the light fixture 135-*g* in communication with some or all of the other components of the light fixture 135-*g* over one or more buses 1035. Alternatively, functionality of the illumination and communication management module 1050 may be implemented as a computer program product and/or as one or more controller elements of the processor module 1010.

Some or all of the components of the light fixture 135-*g* may, individually or collectively, be implemented using one or more ASICs adapted to perform some or all of the applicable functions in hardware. Alternatively, some or all of the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the light fixture 135-*g*.

Figure 11:
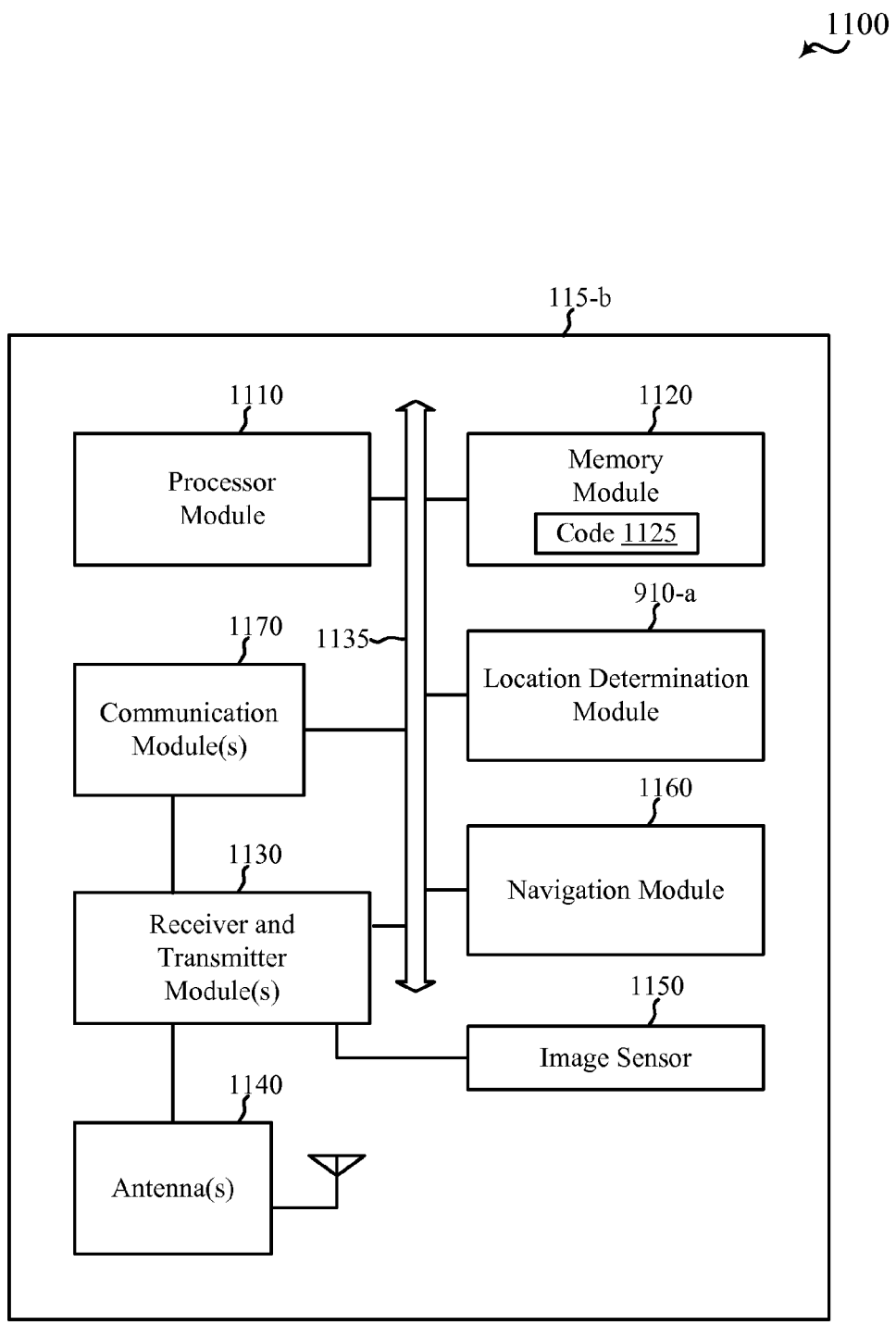
FIG. 11 is a block diagram illustrating an example of a mobile device capable of capturing at least parts of VLC signals from a number of light fixtures, in accordance with various embodiments.

FIG. 11 is a block diagram 1100 illustrating an example of a mobile device 115-*b* capable of capturing at least parts of VLC signals from a number of light fixtures (e.g., from one or more of the light fixtures 135 described with reference to FIGS. 1, 2, and/or 10). The mobile device 115-*b* may be an example of aspects of one or more of the mobile devices 115 described with reference to FIGS. 1 and/or 2, and/or aspects of one or more of the devices 815 described with reference to FIGS. 8 and/or 9. The mobile device 115-*b* may have any of various configurations and may in some cases be or include a cellular device (e.g., a smartphone), a computer (e.g., a tablet computer), a wearable device (e.g., a watch or electronic glasses), a module or assembly associated with a vehicle or robotic machine (e.g., a module or assembly associated with a forklift or vacuum cleaner), etc. In some embodiments, the mobile device 115-*b* may have an internal power supply (not shown), such as a small battery, to facilitate mobile operation.

The mobile device 115-*b* may include a processor module 1110, a memory module 1120, at least one transceiver module (represented by receiver and transmitter module(s) 1130), at least one antenna (represented by antenna(s) 1140), an image sensor 1150, a location determination module 910-*a*, and/or a navigation module 1160. Each of these components may be in communication with each other, directly or indirectly, over one or more buses 1135.

The memory module 1120 may include RAM and/or ROM. The memory module 1120 may store computer-readable, computer-executable code 1125 containing instructions that are configured to, when executed, cause the processor module 1110 to perform various functions described herein, such as deriving an identifier encoded in a VLC signal, determining a location of the mobile device 115-*b*, and/or navigating in response to VLC signals received from a number of light fixtures 135. Alternatively, the code 1125 may not be directly executable by the processor module 1110 but be configured to cause the mobile device 115-*b* (e.g., when compiled and executed) to perform various of the functions described herein.

The processor module 1110 may include an intelligent hardware device, e.g., a CPU, such as an ARM® based processor or those made by Intel® Corporation or AMD®, a microcontroller, an ASIC, etc. The processor module 1110 may process information received via the receiver module(s) of the receiver and transmitter module(s) 1130, as well as information to be transmitted from the mobile device 115-*b* via the transmitter module(s) of the receiver and transceiver module(s) 1130. The processor module 1110 may handle, alone or in connection with the location determination module 910-*a*, various aspects pertaining to determining the location of the mobile device 115-*b*. The processor module 1110 may handle, alone or in connection with the navigation module 1160, various aspects pertaining to navigation of the mobile device 115-*b* based at least in part on VLC signals received from a number of light fixtures 135.

The receiver and transmitter module(s) 1130 may include a modem configured to modulate packets and provide the modulated packets to the antenna(s) 1140 for transmission, and to demodulate packets received from the antenna(s) 1140. The receiver and transmitter module(s) 1130 may in some cases be implemented as one or more transceiver modules. The receiver and transmitter module(s) 1130 may be configured to communicate uni-directionally or bi-directionally, via the antenna(s) 1140, with one or more other devices, such as an access point or base station of a wireless communications network, one or more controllers for a number of light fixtures 135, one or more other mobile devices 115, and/or one or more light fixtures 135. In some cases, the mobile device 115-*b* may be a cellular or Wi-Fi device capable of communicating with one or more cellular or Wi-Fi capable access points, base stations, controllers, mobile devices 115, and/or light fixtures 135. While the mobile device 115-*b* may include a single antenna, there may be embodiments in which the mobile device 115-*b* may include multiple antennas 1140. In some examples, the processor module 1110, location determination module 910-*a*, and/or navigation module 1160 may communicate directly with the receiver and transmitter module(s) 1130. In some examples, the processor module 1110, location determination module 910, and/or navigation module 1160 may communicate with the receiver and transmitter module(s) 1130 via one or more of communication module(s) 1170.

The image sensor 1150 may in some cases include a complimentary metal-oxide semiconductor (CMOS) image sensor, and in some cases may be configured as a rolling shutter image sensor. The image sensor 1150 may be used to capture images of light fixtures 135 and/or VLC signals from light fixtures 135.

The location determination module 910-*a* may be used to determine the location of the mobile device 115-*b* based at least in part a determined location of at least one device that transmits a VLC signal in which an identifier of the device is encoded. The navigation module 1160 may be used to implement a navigation function based at least in part on the determined location of the mobile device 115-*b* with respect to one or more determined locations of one or more devices that transmit VLC signals in which identifiers are encoded. By way of example, the location determination module 910-*a* and/or the navigation module 1160 may be a component of the mobile device 115-*b* in communication with some or all of the other components of the mobile device 115-*b* over one or more buses 1135. Alternatively, functionality of the location determination module 910-*a* and/or the navigation module 1160 may be implemented as a computer program product and/or as one or more controller elements of the processor module 1110.

The components of the mobile device 115-*b* may, individually or collectively, be implemented using one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the mobile device 115-*b*.

Figure 12:
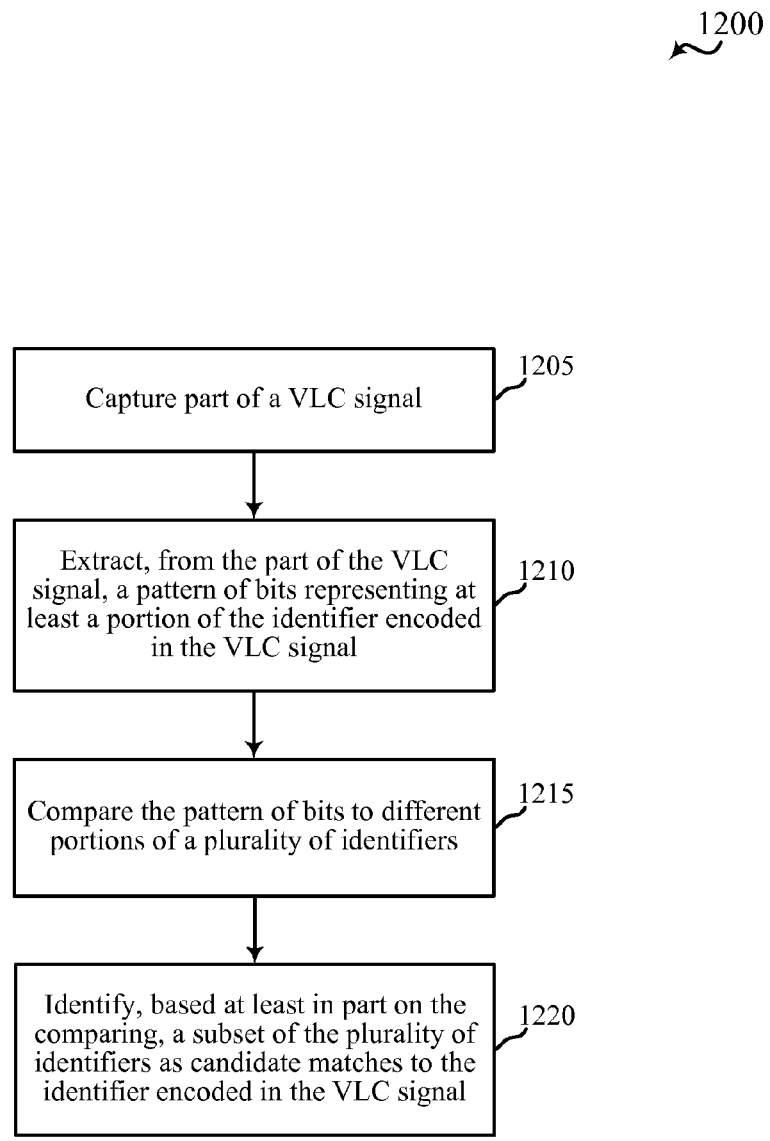
FIG. 12 is a flow chart illustrating a method for deriving an identifier (e.g., an identifier of a light fixture) encoded in a VLC signal, in accordance with various embodiments.

FIG. 12 is a flow chart illustrating a method 1200 for deriving an identifier (e.g., an identifier of a light fixture) encoded in a VLC signal. In some examples, the identifier may be an identifier of a light fixture, such as an identifier of one of the light fixtures 135 described with reference to FIGS. 1, 2, and/or 10. For clarity, the method 1200 is described below with reference to aspects of one or more of the mobile devices 115 described with reference to FIGS. 1, 2, and/or 11, and/or aspects of one or more of the devices 815 described with reference to FIGS. 8 and/or 9. In some examples, the processor module 820 described with reference to FIGS. 8 and/or 9 may execute one or more sets of codes to perform the functions described below.

At block 1205, the method 1200 may include capturing part of a VLC signal. The VLC signal may be received from a light source 145 (e.g., one or more LEDs of a light fixture 135). In some cases, the part of the VLC signal may be captured at a low exposure setting, so that high frequency pulses are not attenuated. The operation(s) at block 1205 may be performed and/or managed using the processor module 820 described with reference to FIGS. 8 and/or 9, the processor module 1110 described with reference to FIG. 11, and/or the VLC signal capture module 840 described with reference to FIGS. 8 and/or 9.

At block 1210, the method 1200 may include extracting, from the part of the VLC signal, a pattern of bits representing at least a portion of the identifier encoded in the VLC signal. In cases where the identifier is encoded in the VLC signal using pulse position modulation, the pattern of bits may be extracted by demodulating each pulse, in each fundamental period, to extract one or more information bits. In some examples, the pattern of bits may include consecutive bits of the identifier. In other examples, the pattern of bits may include at least two nonconsecutive subsets of bits of the identifier. The operation(s) at block 1210 may be performed and/or managed using the processor module 820 described with reference to FIGS. 8 and/or 9, the processor module 1110 described with reference to FIG. 11, and/or the bit pattern extraction module 845 described with reference to FIGS. 8 and/or 9.

In some examples of the method 1200, capturing part of the VLC signal may include capturing part of the VLC signal as illuminated portions of at least one image. The illuminated portions of the at least one image may be captured using a rolling shutter image sensor. In these examples, extracting the pattern of bits may include extracting a pattern of pixel brightness values from the at least one image.

In some examples of the method 1200, the VLC signal may include multiple instances of the identifier. In these examples, the extracted pattern of bits may include part of a first instance of the identifier. In some cases, the extracted pattern of bits may also include part of a second instance of the identifier.

At block 1215, the method 1200 may include comparing the pattern of bits to different portions of a plurality of identifiers. In some examples, each of the plurality of identifiers may correspond to a different VLC-enabled light source. In some examples, the comparing may include programmatically sliding a comparison window with respect to each of the plurality of identifiers. The operation(s) at block 1215 may be performed and/or managed using the processor module 820 described with reference to FIGS. 8 and/or 9, the processor module 1110 described with reference to FIG. 11, and/or the bit pattern comparison module 850 described with reference to FIGS. 8 and/or 9.

In some examples of the method 1200, capturing part of the VLC signal at block 1205 may include capturing a synchronization signal encoded in the VLC signal. In these examples, the comparison of the pattern of bits to different portions of the plurality of identifiers, at block 1215, may be restricted based at least in part on a relationship of the synchronization signal to the pattern of bits. An example of such a restriction is described in further detail with reference to FIG. 7.

In some examples of the method 1200, the plurality of identifiers may be associated with a venue. In these examples, the method 1200 may include receiving the plurality of identifiers from a database associated with the venue. In some cases, the database may be received over a network (e.g., over a WLAN and/or a WWAN).

At block 1220, the method 1200 may include identifying, based at least in part on the comparing performed at block 1215, a subset of the plurality of identifiers as candidate matches to the identifier encoded in the VLC signal. The operation(s) at block 1220 may be performed and/or managed using the processor module 820 described with reference to FIGS. 8 and/or 9, the processor module 1110 described with reference to FIG. 11, and/or the match identification module 855 described with reference to FIGS. 8 and/or 9.

Therefore, the method 1200 may be used for deriving an identifier encoded in a VLC signal. It should be noted that the method 1200 is just one implementation and that the operations of the method 1200 may be rearranged or otherwise modified such that other implementations are possible.

Figure 13:
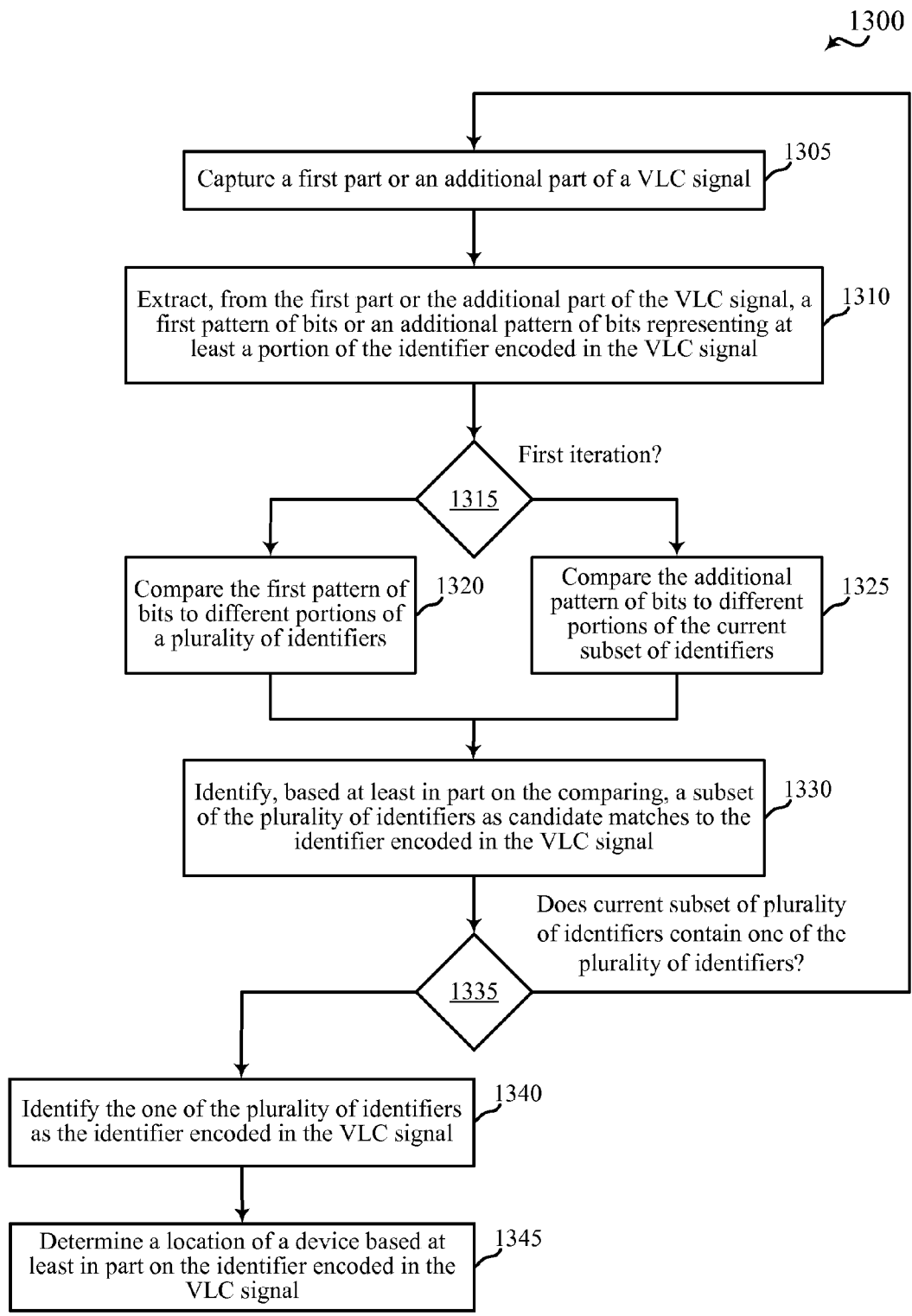
FIG. 13 is a flow chart illustrating a method for deriving an identifier (e.g., an identifier of a light fixture) encoded in a VLC signal, in accordance with various embodiments.

FIG. 13 is a flow chart illustrating a method 1300 for deriving an identifier (e.g., an identifier of a light fixture 135) encoded in a VLC signal. In some examples, the identifier may be an identifier of a light fixture, such as an identifier of one of the light fixtures 135 described with reference to FIGS. 1, 2, and/or 10. For clarity, the method 1300 is described below with reference to aspects of one or more of the mobile devices 115 described with reference to FIGS. 1, 2, and/or 11, and/or aspects of one or more of the devices 815 described with reference to FIGS. 8 and/or 9. In some examples, the processor module 820 described with reference to FIGS. 8 and/or 9 may execute one or more sets of codes to perform the functions described below.

In some examples of the method 1300, the operations performed at blocks 1305, 1310, 1315, 1320 or 1325, 1330, and 1335 may be performed iteratively.

At block 1305, and during a first iteration of the operations performed at blocks 1305, 1310, 1315, 1320 or 1325, 1330, and 1335, the method 1300 may include capturing a first part of a VLC signal. The VLC signal may be received from a light source 145 (e.g., one or more LEDs of a light fixture 135). In some cases, the first part of the VLC signal may be captured at a low exposure setting, so that high frequency pulses are not attenuated. The operation(s) at block 1305 may be performed and/or managed using the processor module 820 described with reference to FIGS. 8 and/or 9, the processor module 1110 described with reference to FIG. 11, and/or the VLC signal capture module 840 described with reference to FIGS. 8 and/or 9.

At block 1310, the method 1300 may include extracting, from the first part of the VLC signal, a first pattern of bits representing at least a portion of the identifier encoded in the VLC signal. In cases where the identifier is encoded in the VLC signal using pulse position modulation, the pattern of bits may be extracted by demodulating each pulse, in each fundamental period, to extract one or more information bits. In some examples, the first pattern of bits may include consecutive bits of the identifier. In other examples, the first pattern of bits may include at least two nonconsecutive subsets of bits of the identifier. The operation(s) at block 1310 may be performed and/or managed using the processor module 820 described with reference to FIGS. 8 and/or 9, the processor module 1110 described with reference to FIG. 11, and/or the bit pattern extraction module 845 described with reference to FIGS. 8 and/or 9.

In some examples of the method 1300, capturing the first part of the VLC signal may include capturing the first part of the VLC signal as illuminated portions of at least one image. The illuminated portions of the at least one image may be captured using a rolling shutter image sensor. In these examples, extracting the pattern of bits may include extracting a pattern of pixel brightness values from the at least one image.

In some examples of the method 1300, the VLC signal may include multiple instances of the identifier. In these examples, the extracted first pattern of bits may include part of a first instance of the identifier. In some cases, the extracted first pattern of bits may also include part of a second instance of the identifier.

At block 1315, it may be determined whether it is the first iteration through the operations performed at blocks 1305, 1310, 1315, 1320 or 1325, 1330, and 1335. When it is determined that it is the first iteration, the operation(s) at block 1320 may be performed. At block 1320, the method 1300 may include comparing the first pattern of bits to different portions of a plurality of identifiers. In some examples, each of the plurality of identifiers may correspond to a different VLC-enabled light source. In some examples, the comparing may include programmatically sliding a comparison window with respect to each of the plurality of identifiers. The operation(s) at block 1320 may be performed and/or managed using the processor module 820 described with reference to FIGS. 8 and/or 9, the processor module 1110 described with reference to FIG. 11, and/or the bit pattern comparison module 850 described with reference to FIGS. 8 and/or 9.

In some examples of the method 1300, capturing the first part of the VLC signal at block 1305 may include capturing a synchronization signal encoded in the VLC signal. In these examples, the comparison of the first pattern of bits to different portions of the plurality of identifiers, at block 1320, may be restricted based at least in part on a relationship of the synchronization signal to the first pattern of bits. An example of such a restriction is described in further detail with reference to FIG. 7.

In some examples of the method 1300, the plurality of identifiers may be associated with a venue. In these examples, the method 1300 may include receiving the plurality of identifiers from a database associated with the venue. In some cases, the database may be received over a network (e.g., over a WLAN and/or a WWAN).

At block 1330, the method 1300 may include identifying, based at least in part on the comparing performed at block 1320, a subset of the plurality of identifiers as candidate matches to the identifier encoded in the VLC signal. The operation(s) at block 1330 may be performed and/or managed using the processor module 820 described with reference to FIGS. 8 and/or 9, the processor module 1110 described with reference to FIG. 11, and/or the match identification module 855 described with reference to FIGS. 8 and/or 9.

At block 1335, it may be determined whether the subset of the plurality of identifiers identified at block 1330 contains one (e.g., only one) of the plurality of identifiers. When it is determined that the subset of the plurality of identifiers only one of the plurality of identifiers, the one of the plurality of identifiers may be identified, at block 1340, as the identifier encoded in the VLC signal. When it is determined that the subset of the plurality identifiers contains more than one of the plurality of identifiers, the operations performed at blocks 1305, 1310, 1315, 1320 or 1325, 1330, and 1335 may be repeated. The operation(s) at block 1335 and/or 1340 may be performed and/or managed using the processor module 820 described with reference to FIGS. 8 and/or 9, the processor module 1110 described with reference to FIG. 11, and/or the match identification module 855 described with reference to FIGS. 8 and/or 9.

At block 1345, the method may include determining a location of a device that transmits a VLC signal (e.g., a location of a light source 145 and/or light fixture 135) based at least in part on an identifier encoded in the VLC signal. In some examples, the operations at block 1345 may also include determining, based at least in part on the location of the device that transmits the VLC signal, a location of the mobile device 115 and/or device 815 that captures the part or parts of the VLC signal at block 1305. In some examples, the operations at block 1345 may include determining the locations of a plurality of devices that transmit VLC signals, and determining the location of the mobile device 115 and/or device 815 based at least in part on the determined locations of the plurality of devices that transmit VLC signals. In some examples, the method 1300 may further include performing a navigation function based at least in part on a determined location of the mobile device 115 and/or device 815 with respect to one or more determined locations of one or more devices that transmit VLC signals. The operation(s) at block 1345 may be performed and/or managed using the processor module 820 described with reference to FIGS. 8 and/or 9, the location determination module 910 described with reference to FIGS. 9 and/or 11, and/or the processor module 1110 and/or navigation module 1160 described with reference to FIG. 11.

At block 1305, and during an additional iteration (e.g., a second iteration) of the operations performed at blocks 1305, 1310, 1315, 1320 or 1325, 1330, and 1335, the method 1300 may include capturing an additional part (e.g., a second part) of a VLC signal.

During an additional iteration of the operation(s) at block 1310, the method 1300 may include extracting, from the additional part (e.g., the second part) of the VLC signal, an additional pattern of bits (e.g., a second pattern of bits) representing at least a portion of the identifier encoded in the VLC signal. In cases where the identifier is encoded in the VLC signal using pulse position modulation, the pattern of bits may be extracted by demodulating each pulse, in each fundamental period, to extract one or more information bits. In some examples, the additional pattern of bits may include consecutive bits of the identifier. In other examples, the additional pattern of bits may include at least two nonconsecutive subsets of bits of the identifier.

In some examples of the method 1300, the VLC signal may include multiple instances of the identifier. In these examples, the extracted additional pattern of bits may include part of a second or third instance of the identifier. In some cases, the extracted additional pattern of bits may also include part of a third or fourth instance of the identifier.

During an additional iteration of the operation(s) at block 1315, it may be determined whether it is the first iteration through the operations performed at blocks 1305, 1310, 1315, 1320 or 1325, 1330, and 1335. When it is determined that it is not the first iteration, the operation(s) at block 1325 may be performed. At block 1325, the method 1300 may include comparing the additional pattern of bits (e.g., the second pattern of bits) to different portions of the subset of the plurality of identifiers identified during a previous iteration through the operations performed at blocks 1305, 1310, 1315, 1320 or 1325, 1330, and 1335. In some examples, the comparing may include programmatically sliding a comparison window with respect to each of the plurality of identifiers in the subset of the plurality of identifiers. The operation(s) at block 1325 may be performed and/or managed using the processor module 720 described with reference to FIGS. 8 and/or 9, the processor module 1110 described with reference to FIG. 11, and/or the bit pattern comparison module 850 described with reference to FIGS. 8 and/or 9.

In some examples of the method 1300, capturing the additional part (e.g., the second part) of the VLC signal at block 1305 may include capturing a synchronization signal encoded in the VLC signal. In these examples, the comparison of the additional pattern of bits (e.g., the second pattern of bits) to different portions of the subset of the plurality of identifiers, at block 1325, may be restricted based at least in part on a relationship of the synchronization signal to the additional pattern of bits. An example of such a restriction is described in further detail with reference to FIG. 7.

During an additional iteration of the operation(s) at block 1330, the method 1300 may include identifying, based at least in part on the comparing performed at block 1325, a subset of the plurality of identifiers as candidate matches to the identifier encoded in the VLC signal. The subset of the plurality of identifiers may in some cases include fewer candidate matches than a subset of the plurality of identifiers identified during a previous iteration through the operations performed at blocks 1305, 1310, 1315, 1320 or 1325, 1330, and 1335.

During an additional iteration of the operation(s) at block 1335, it may be determined whether the subset of the plurality of identifiers identified at block 1330 contains one (e.g., only one) of the plurality of identifiers. When it is determined that the subset of the plurality of identifiers contains only one of the plurality of identifiers, the one of the plurality of identifiers may be identified, at block 1340, as the identifier encoded in the VLC signal. When it is determined that the subset of the plurality identifiers contains more than one of the plurality of identifiers, the operations performed at blocks 1305, 1310, 1315, 1320 or 1325, 1330, and 1335 may be repeated until a subset of the plurality of identifiers identified at block 1330 contains only one of the plurality of identifiers.

Therefore, the method 1300 may be used for deriving an identifier encoded in a VLC signal. It should be noted that the method 1300 is just one implementation and that the operations of the method 1300 may be rearranged or otherwise modified such that other implementations are possible.

Figure 14:
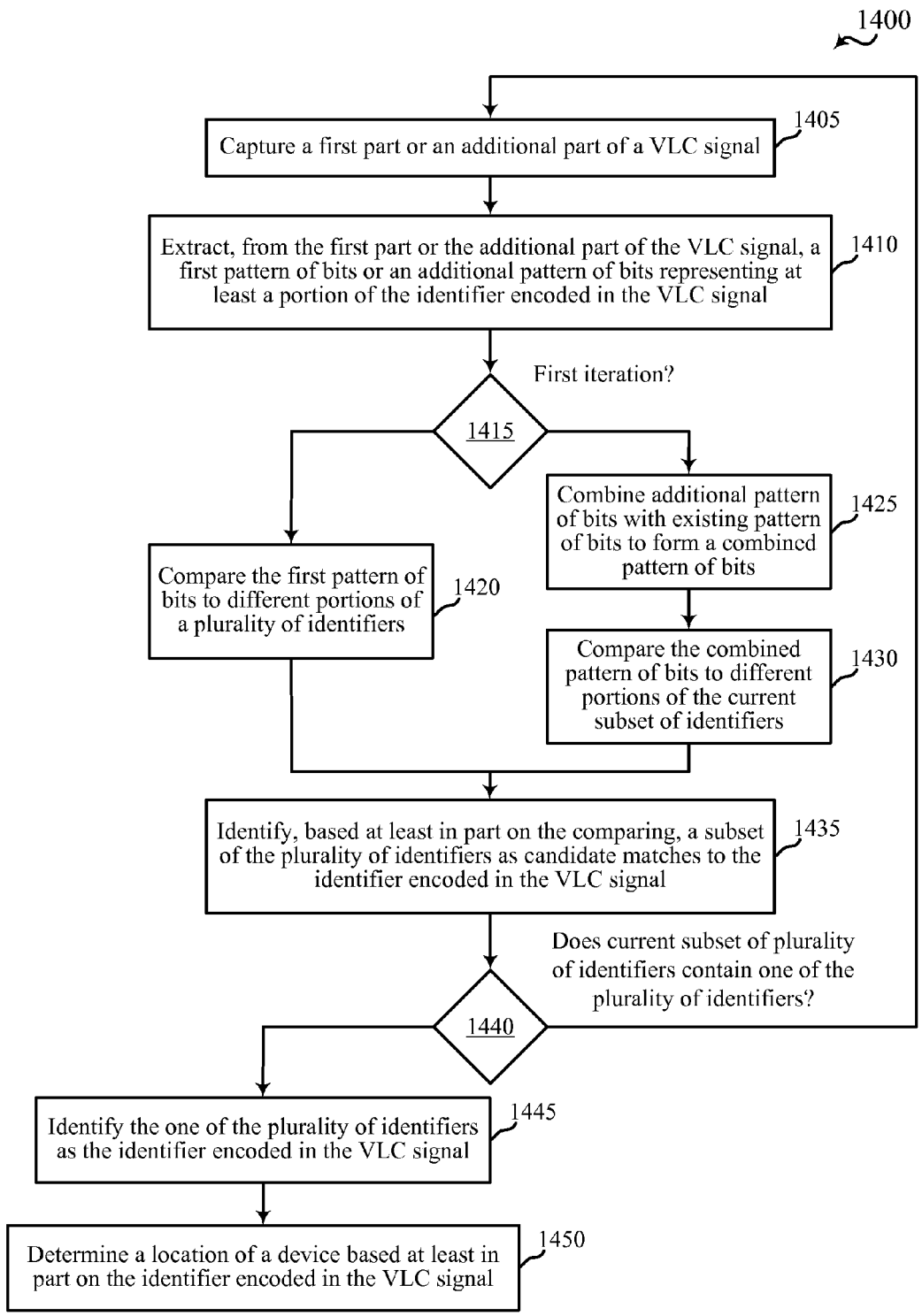
FIG. 14 is a flow chart illustrating a method for deriving an identifier (e.g., an identifier of a light fixture) encoded in a VLC signal, in accordance with various embodiments.

FIG. 14 is a flow chart illustrating a method 1400 for deriving an identifier (e.g., an identifier of a light fixture 135) encoded in a VLC signal. In some examples, the identifier may be an identifier of a light fixture, such as an identifier of one of the light fixtures 135 described with reference to FIGS. 1, 2, and/or 10. For clarity, the method 1400 is described below with reference to aspects of one or more of the mobile devices 115 described with reference to FIGS. 1, 2, and/or 11, and/or aspects of one or more of the devices 815 described with reference to FIGS. 8 and/or 9. In some examples, the processor module 820 described with reference to FIGS. 8 and/or 9 may execute one or more sets of codes to perform the functions described below.

In some examples of the method 1400, the operations performed at blocks 1405, 1410, 1415, 1420 or 1425/1430, 1435, and 1440 may be performed iteratively.

At block 1405, and during a first iteration of the operations performed at blocks 1405, 1410, 1415, 1420 or 1425/1430, 1435, and 1440, the method 1400 may include capturing a first part of a VLC signal. The VLC signal may be received from a light source 145 (e.g., one or more LEDs of a light fixture 135). In some cases, the part of the VLC signal may be captured at a low exposure setting, so that high frequency pulses are not attenuated. The operation(s) at block 1405 may be performed and/or managed using the processor module 820 described with reference to FIGS. 8 and/or 9, the processor module 1110 described with reference to FIG. 11, and/or the VLC signal capture module 840 described with reference to FIGS. 8 and/or 9.

At block 1410, the method 1400 may include extracting, from the first part of the VLC signal, a first pattern of bits representing at least a portion of the identifier encoded in the VLC signal. In cases where the identifier is encoded in the VLC signal using pulse position modulation, the pattern of bits may be extracted by demodulating each pulse, in each fundamental period, to extract one or more information bits. In some examples, the first pattern of bits may include consecutive bits of the identifier. In other examples, the first pattern of bits may include at least two nonconsecutive subsets of bits of the identifier. The operation(s) at block 1410 may be performed and/or managed using the processor module 820 described with reference to FIGS. 8 and/or 9, the processor module 1110 described with reference to FIG. 11, and/or the bit pattern extraction module 845 described with reference to FIGS. 8 and/or 9.

In some examples of the method 1400, capturing the first part of the VLC signal may include capturing the first part of the VLC signal as illuminated portions of at least one image. The illuminated portions of the at least one image may be captured using a rolling shutter image sensor. In these examples, extracting the pattern of bits may include extracting a pattern of pixel brightness values from the at least one image.

In some examples of the method 1400, the VLC signal may include multiple instances of the identifier. In these examples, the extracted first pattern of bits may include part of a first instance of the identifier. In some cases, the extracted first pattern of bits may also include part of a second instance of the identifier.

At block 1415, it may be determined whether it is the first iteration through the operations performed at blocks 1405, 1410, 1415, 1420 or 1425/1430, 1435, and 1440. When it is determined that it is the first iteration, the operation(s) at block 1420 may be performed. At block 1420, the method 1400 may include comparing the first pattern of bits to different portions of a plurality of identifiers. In some examples, each of the plurality of identifiers may correspond to a different VLC-enabled light source. In some examples, the comparing may include programmatically sliding a comparison window with respect to each of the plurality of identifiers. The operation(s) at block 1420 may be performed and/or managed using the processor module 820 described with reference to FIGS. 8 and/or 9, the processor module 1110 described with reference to FIG. 11, and/or the bit pattern comparison module 850 described with reference to FIGS. 8 and/or 9.

In some examples of the method 1400, capturing the first part of the VLC signal at block 1405 may include capturing a synchronization signal encoded in the VLC signal. In these examples, the comparison of the first pattern of bits to different portions of the plurality of identifiers, at block 1420, may be restricted based at least in part on a relationship of the synchronization signal to the first pattern of bits. An example of such a restriction is described in further detail with reference to FIG. 7.

In some examples of the method 1400, the plurality of identifiers may be associated with a venue. In these examples, the method 1400 may include receiving the plurality of identifiers from a database associated with the venue. In some cases, the database may be received over a network (e.g., over a WLAN and/or a WWAN).

At block 1435, the method 1400 may include identifying, based at least in part on the comparing performed at block 1420, a subset of the plurality of identifiers as candidate matches to the identifier encoded in the VLC signal. The operation(s) at block 1435 may be performed and/or managed using the processor module 820 described with reference to FIGS. 8 and/or 9, the processor module 1110 described with reference to FIG. 11, and/or the match identification module 855 described with reference to FIGS. 8 and/or 9.

At block 1440, it may be determined whether the subset of the plurality of identifiers identified at block 1435 contains one (e.g., only one) of the plurality of identifiers. When it is determined that the subset of the plurality of identifiers only one of the plurality of identifiers, the one of the plurality of identifiers may be identified, at block 1445, as the identifier encoded in the VLC signal. When it is determined that the subset of the plurality identifiers contains more than one of the plurality of identifiers, the operations performed at blocks 1405, 1410, 1415, 1420 or 1425/1430, 1435, and 1440 may be repeated. The operation(s) at block 1440 and/or 1445 may be performed and/or managed using the processor module 820 described with reference to FIGS. 8 and/or 9, the processor module 1010 described with reference to FIG. 11, and/or the match identification module 855 described with reference to FIGS. 8 and/or 9.

At block 1450, the method 1400 may include determining a location of a device that transmits a VLC signal (e.g., a location of a light source 145 and/or light fixture 135) based at least in part on an identifier encoded in the VLC signal. In some examples, the operations at block 1450 may also include determining, based at least in part on the location of the device that transmits the VLC signal, a location of the mobile device 115 and/or device 815 that captures the part or parts of the VLC signal at block 1405. In some examples, the operations at block 1450 may include determining the locations of a plurality of devices that transmit VLC signals, and determining the location of the mobile device 115 and/or device 815 based at least in part on the determined locations of the plurality of devices that transmit VLC signals. In some examples, the method 1400 may further include performing a navigation function based at least in part on a determined location of the mobile device 115 and/or device 815 with respect to one or more determined locations of one or more devices that transmit VLC signals. The operation(s) at block 1450 may be performed and/or managed using the processor module 820 described with reference to FIGS. 8 and/or 9, the location determination module 910 described with reference to FIGS. 9 and/or 11, and/or the processor module 1110 and/or navigation module 1160 described with reference to FIG. 11.

At block 1405, and during an additional iteration (e.g., a second iteration) of the operations performed at blocks 1405, 1410, 1415, 1420 or 1425/1430, 1435, and 1440, the method 1400 may include capturing an additional part (e.g., a second part) of a VLC signal. In some cases, the additional part of the VLC signal may be captured at a low exposure setting, so that high frequency pulses are not attenuated.

During an additional iteration of the operation(s) at block 1410, the method 1400 may include extracting, from the additional part (e.g., the second part) of the VLC signal, an additional pattern of bits (e.g., a second pattern of bits) representing at least a portion of the identifier encoded in the VLC signal. In cases where the identifier is encoded in the VLC signal using pulse position modulation, the pattern of bits may be extracted by demodulating each pulse, in each fundamental period, to extract one or more information bits. In some examples, the additional pattern of bits may include consecutive bits of the identifier. In other examples, the additional pattern of bits may include at least two nonconsecutive subsets of bits of the identifier.

In some examples of the method 1400, the VLC signal may include multiple instances of the identifier. In these examples, the extracted additional pattern of bits may include part of a second or third instance of the identifier. In some cases, the extracted additional pattern of bits may also include part of a third or fourth instance of the identifier.

During an additional iteration of the operation(s) at block 1415, it may be determined whether it is the first iteration through the operations performed at blocks 1405, 1410, 1415, 1420 or 1425/1430, 1435, and 1440. When it is determined that it is not the first iteration, the operation(s) at blocks 1425 and 1430 may be performed.

At block 1425, the method 1400 may include combining the additional pattern of bits (e.g., the second pattern of bits) with a previously extracted pattern of bits (e.g., the first pattern of bits) to form a combined pattern of bits. The operation(s) at block 1425 may be performed and/or managed using the processor module 820 described with reference to FIGS. 8 and/or 9, the processor module 1110 described with reference to FIG. 11, and/or the bit pattern combination module 905 described with reference to FIG. 9.

At block 1430, the method 1400 may include comparing the combined pattern of bits to different portions of the subset of the plurality of identifiers identified during a previous iteration through the operations performed at blocks 1405, 1410, 1415, 1420 or 1425/1430, 1435, and 1440. Alternatively, the combined pattern of bits may be compared to different portions of the plurality of identifiers. In some examples, the comparing may include programmatically sliding a comparison window with respect to each of the plurality of identifiers in the subset of the plurality of identifiers. The operation(s) at block 1430 may be performed and/or managed using the processor module 820 described with reference to FIGS. 8 and/or 9, the processor module 1110 described with reference to FIG. 11, and/or the bit pattern comparison module 850 described with reference to FIGS. 8 and/or 9.

In some examples of the method 1400, capturing the additional part (e.g., the second part) of the VLC signal at block 1405 may include capturing a synchronization signal encoded in the VLC signal. In these examples, the comparison of the combined pattern of bits to different portions of the subset of the plurality of identifiers (or to different portions of the plurality of identifiers), at block 1430, may be restricted based at least in part on a relationship of the synchronization signal to the combined pattern of bits. An example of such a restriction is described in further detail with reference to FIG. 7.

During an additional iteration of the operation(s) at block 1435, the method 1400 may include identifying, based at least in part on the comparing performed at block 1430, a subset (e.g., a second subset) of the plurality of identifiers as candidate matches to the identifier encoded in the VLC signal. The subset of the plurality of identifiers may in some cases include fewer candidate matches than a subset of the plurality of identifiers identified during a previous iteration through the operations performed at blocks 1405, 1410, 1415, 1420 or 1425/1430, 1435, and 1440.

During an additional iteration of the operation(s) at block 1440, it may be determined whether the subset of the plurality of identifiers identified at block 1435 contains one (e.g., only one) of the plurality of identifiers. When it is determined that the subset of the plurality of identifiers contains only one of the plurality of identifiers, the one of the plurality of identifiers may be identified, at block 1445, as the identifier encoded in the VLC signal. When it is determined that the subset of the plurality of identifiers contains more than one of the plurality of identifiers, the operations performed at blocks 1405, 1410, 1415, 1420 or 1425/1430, 1435, and 1440 may be repeated until a subset of the plurality of identifiers identified at block 1435 contains only one of the plurality of identifiers.

Therefore, the method 1400 may be used for deriving an identifier encoded in a VLC signal. It should be noted that the method 1400 is just one implementation and that the operations of the method 1400 may be rearranged or otherwise modified such that other implementations are possible.

In some examples, operations of the methods 1200, 1300, and/or 1400 described with reference to FIGS. 12, 13, and/or 14 may be combined.

Techniques described herein may be used to determine the orientations of mobile devices operating in various wireless communication systems, such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may, individually or collectively, be implemented or performed with one or more application-specific integrated circuits (ASICs) adapted to perform some or all of the applicable functions in hardware. Alternatively, the functions may be performed by one or more other processing units (or cores) such as a general-purpose processor or a digital signal processor (DSP), and/or on one or more integrated circuits. A general-purpose processor may be a microprocessor, any conventional processor, controller, microcontroller, state machine, or combination thereof. A processor may also be implemented as a combination of computing devices, e.g., a combination of a DSP and a microprocessor, multiple microprocessors, one or more microprocessors in conjunction with a DSP core, or any other such configuration. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each of the blocks and modules may also be implemented, in whole or in part, with instructions embodied in a memory, formatted to be executed by one or more general or application-specific processors.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The detailed description set forth above in connection with the appended drawings is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments. Thus, the disclosure is not to be limited to the examples and designs described herein but is to be accorded the widest scope consistent with the principles and novel features disclosed herein.

What is claimed is:

1. A method of deriving an identifier encoded in a visible light communication (VLC) signal, comprising:
  capturing, via an image sensor of a receiving device, a VLC signal, the VLC signal comprising multiple instances of the identifier, the identifier identifying a VLC-enabled light source;
  extracting, at the receiving device, at least a first pattern of bits and a second pattern of bits, the first pattern of bits comprising a portion of a first instance of the identifier, and the second pattern of bits comprising a portion of a second instance of the identifier;
  comparing, at the receiving device, the first pattern of bits and the second pattern of bits to different portions of a plurality of identifiers;
  identifying, at the receiving device, based at least in part on comparing the first pattern of bits to different portions of a plurality of identifiers, a first subset of the plurality of identifiers as candidate matches to the identifier encoded in the VLC signal; and
  identifying, at the receiving device, based at least in part on comparing the second pattern of bits to different portions of the subset of the plurality of identifiers, a second subset of the plurality of identifiers as candidate matches to the identifier encoded in the VLC signal.

2. The method of claim 1, further comprising:
  when the first subset or second subset of the plurality of identifiers contains one of the plurality of identifiers, identifying the one of the plurality of identifiers as the identifier encoded in the VLC signal.

3. The method of claim 1, further comprising:
  combining the second pattern of bits with the first pattern of bits to form a combined pattern of bits.

4. The method of claim 3, further comprising:
  comparing the combined pattern of bits to different portions of the first subset of the plurality of identifiers; and
  identifying, based at least in part on the comparing of the combined pattern of bits to different portions of the first subset of the plurality of identifiers, a third subset of the plurality of identifiers as candidate matches to the identifier encoded in the VLC signal.

5. The method of claim 3, further comprising:
  comparing the combined pattern of bits to different portions of the plurality of identifiers; and
  identifying, based at least in part on the comparing of the combined pattern of bits to different portions of the plurality of identifiers, a third subset of the plurality of identifiers as candidate matches to the identifier encoded in the VLC signal.

6. The method of claim 1, wherein:
  capturing the VLC signal comprises capturing the VLC signal as illuminated portions of at least one image using a rolling shutter image sensor; and
  extracting the first pattern of bits and the second pattern of bits comprises extracting a pattern of pixel brightness values from the at least one image.

7. The method of claim 1, wherein capturing the VLC signal comprises capturing a synchronization signal encoded in the VLC signal, the method further comprising:
  restricting the comparing the first pattern of bits and the second pattern of bits to different portions of the plurality of identifiers based at least in part on a relationship of the synchronization signal to the first pattern of bits and the second pattern of bits.

8. The method of claim 1, wherein each of the plurality of identifiers corresponds to a different VLC-enabled light source.

9. The method of claim 1, further comprising:
receiving the plurality of identifiers from a database associated with a venue.

10. A device for deriving an identifier encoded in a visible light communication (VLC) signal, comprising:
means for capturing the VLC signal, the VLC signal comprising multiple instances of the identifier, the identifier identifying a VLC-enabled light source;
means for extracting, at least a first pattern of bits and a second pattern of bits, the first pattern of bits comprising a portion of a first instance of the identifier, and the second pattern of bits comprising a portion of a second instance of the identifier;
means for comparing the first pattern of bits and the second pattern of bits to different portions of a plurality of identifiers;
means for identifying, based at least in part on comparing the first pattern of bits to different portions of a plurality of identifiers, a first subset of the plurality of identifiers as candidate matches to the identifier encoded in the VLC signal; and
means for identifying, based at least in part on comparing the second pattern of bits to different portions of the subset of the plurality of identifiers, a second subset of the plurality of identifiers as candidate matches to the identifier encoded in the VLC signal.

11. The device of claim 10, further comprising:
means for identifying the one of the plurality of identifiers as the identifier encoded in the VLC signal when the first subset or second subset of the plurality of identifiers contains one of the plurality of identifiers.

12. The device of claim 10, further comprising:
means for combining the second pattern of bits with the first pattern of bits to form a combined pattern of bits.

13. The device of claim 12, further comprising:
means for comparing the combined pattern of bits to different portions of the first subset of the plurality of identifiers; and
means for identifying, based at least in part on the comparing of the combined pattern of bits to different portions of the first subset of the plurality of identifiers, a third subset of the plurality of identifiers as candidate matches to the identifier encoded in the VLC signal.

14. The device of claim 12, further comprising:
means for comparing the combined pattern of bits to different portions of the plurality of identifiers; and
means for identifying, based at least in part on the comparing of the combined pattern of bits to different portions of the plurality of identifiers, a third subset of the plurality of identifiers as candidate matches to the identifier encoded in the VLC signal.

15. The device of claim 10, wherein:
the means for capturing the VLC signal comprises capturing the VLC signal as illuminated portions of at least one image using a rolling shutter image sensor; and
the means for extracting the first pattern of bits and the second pattern of bits comprises means for extracting a pattern of pixel brightness values from the at least one image.

16. The device of claim 10, wherein the means for capturing the VLC signal comprises means for capturing a synchronization signal encoded in the VLC signal, the device further comprising:
means for restricting the comparing the first pattern of bits and the second pattern of bits to different portions of the plurality of identifiers based at least in part on a relationship of the synchronization signal to the first pattern of bits and the second pattern of bits.

17. The device of claim 10, wherein each of the plurality of identifiers corresponds to a different VLC-enabled light source.

18. The device of claim 10, further comprising:
means for receiving the plurality of identifiers from a database associated with a venue.

19. A device for deriving an identifier encoded in a visible light communication (VLC) signal, comprising a processor, memory in electronic communication with the processor, and instructions stored in the memory, the instructions being executable by the processor to:
capture the VLC signal, the VLC signal comprising multiple instances of the identifier, the identifier identifying a VLC-enabled light source;
extract, at least a first pattern of bits and a second pattern of bits, the first pattern of bits comprising a portion of a first instance of the identifier, and the second pattern of bits comprising a portion of a second instance of the identifier;
compare the first pattern of bits and the second pattern of bits to different portions of a plurality of identifiers;
identify, based at least in part on comparing the first pattern of bits to different portions of a plurality of identifiers, a first subset of the plurality of identifiers as candidate matches to the identifier encoded in the VLC signal; and
identify, based at least in part on comparing the second pattern of bits to different portions of the subset of the plurality of identifiers, a second subset of the plurality of identifiers as candidate matches to the identifier encoded in the VLC signal.

20. The device of claim 19, wherein the instructions are executable by the processor to:
identify the one of the plurality of identifiers as the identifier encoded in the VLC signal when the first subset or second subset of the plurality of identifiers contains one of the plurality of identifiers.

21. The device of claim 19, wherein the instructions executable by the processor to capture the first part of the VLC signal comprise instructions executable by the processor to capture a synchronization signal encoded in the VLC signal, and wherein the instructions are executable by the processor to:
restrict the comparing the first pattern of bits and the second pattern of bits to different portions of the plurality of identifiers based at least in part on a relationship of the synchronization signal to the first pattern of bits and the second pattern of bits.

22. The device of claim 19, wherein the instructions are executable by the processor to:
combine the second pattern of bits with the first pattern of bits to form a combined pattern of bits.

23. The device of claim 22, wherein the instructions are executable by the processor to:
compare the combined pattern of bits to different portions of the first subset of the plurality of identifiers; and
identify, based at least in part on the comparing of the combined pattern of bits to different portions of the first subset of the plurality of identifiers, a third subset of the plurality of identifiers as candidate matches to the identifier encoded in the VLC signal.

24. The device of claim 22, wherein the instructions are executable by the processor to:
   compare the combined pattern of bits to different portions of the plurality of identifiers; and
   identify, based at least in part on the comparing of the combined pattern of bits to different portions of the plurality of identifiers, a third subset of the plurality of identifiers as candidate matches to the identifier encoded in the VLC signal.

25. The computer-readable medium of claim 24, wherein the code is executable by the processor to:
   compare the combined pattern of bits to different portions of the first subset of the plurality of identifiers; and
   identify, based at least in part on the comparing of the combined pattern of bits to different portions of the first subset of the plurality of identifiers, a third subset of the plurality of identifiers as candidate matches to the identifier encoded in the VLC signal.

26. The computer-readable medium of claim 24, wherein the code is executable by the processor to:
   compare the combined pattern of bits to different portions of the plurality of identifiers; and
   identify, based at least in part on the comparing of the combined pattern of bits to different portions of the plurality of identifiers, a third subset of the plurality of identifiers as candidate matches to the identifier encoded in the VLC signal.

27. A non-transitory computer-readable medium storing computer-executable code for deriving an identifier encoded in a visible light communication (VLC) signal, the code executable by a processor to:
   capture the VLC signal, the VLC signal comprising multiple instances of the identifier, the identifier identifying a VLC-enabled light source;
   extract, at least a first pattern of bits and a second pattern of bits, the first pattern of bits comprising a portion of a first instance of the identifier, and the second pattern of bits comprising a portion of a second instance of the identifier;
   compare the first pattern of bits and the second pattern of bits to different portions of a plurality of identifiers;
   identify, based at least in part on comparing the first pattern of bits to different portions of a plurality of identifiers, a first subset of the plurality of identifiers as candidate matches to the identifier encoded in the VLC signal; and
   identify, based at least in part on comparing the second pattern of bits to different portions of the subset of the plurality of identifiers, a second subset of the plurality of identifiers as candidate matches to the identifier encoded in the VLC signal.

28. The computer-readable medium of claim 27, wherein the code is executable by the processor to:
   identify the one of the plurality of identifiers as the identifier encoded in the VLC signal when the first subset or second subset of the plurality of identifiers contains one of the plurality of identifiers.

29. The computer-readable medium of claim 27, wherein the code executable by the processor to cause the device to capture the first part of the VLC signal comprise code executable by the processor to cause the device to capture a synchronization signal encoded in the VLC signal, and wherein the code is executable by the processor to:
   restrict the comparing the first pattern of bits and the second pattern of bits to different portions of the plurality of identifiers based at least in part on a relationship of the synchronization signal to the first pattern of bits and the second pattern of bits.

30. The computer-readable medium of claim 27, wherein the code is executable by the processor to:
   combine the second pattern of bits with the first pattern of bits to form a combined pattern of bits.

* * * * *